US010565609B2

(12) United States Patent
    Matsuda

(10) Patent No.: US 10,565,609 B2
(45) Date of Patent: Feb. 18, 2020

(54) INFORMATION PROCESSING APPARATUS, INFORMATION PROCESSING METHOD, INFORMATION PROCESSING PROGRAM, AND RECORDING MEDIUM

(71) Applicant: Rakuten, Inc., Shinagawa-ku, Tokyo (JP)

(72) Inventor: Atsuyoshi Matsuda, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 968 days.

(21) Appl. No.: 14/388,098

(22) PCT Filed: Oct. 15, 2012

(86) PCT No.: PCT/JP2012/076616
§ 371 (c)(1),
(2) Date: Sep. 25, 2014

(87) PCT Pub. No.: WO2013/145393
PCT Pub. Date: Oct. 3, 2013

(65) Prior Publication Data
US 2015/0051963 A1    Feb. 19, 2015

(30) Foreign Application Priority Data
Mar. 26, 2012  (JP) .................. 2012-069473

(51) Int. Cl.
*G06Q 30/00* (2012.01)
*G06Q 30/02* (2012.01)
*G06Q 30/06* (2012.01)

(52) U.S. Cl.
CPC ......... *G06Q 30/0222* (2013.01); *G06Q 30/06* (2013.01)

(58) Field of Classification Search
None
See application file for complete search history.

(56) References Cited

U.S. PATENT DOCUMENTS 5,999,914 A * 12/1999 Blinn .................. G06Q 30/02
                                                          705/14.1
2001/0053998 A1  12/2001 Kohda et al.
(Continued)

FOREIGN PATENT DOCUMENTS

JP    2002-007834 A    1/2002
JP    2004-139315 A    5/2004
(Continued)

OTHER PUBLICATIONS

Nichiyobi no Otanoshimi—Rakuten Blog, [online], Aug. 8, 2009 [search date: Apr. 19, 2013], Internet, <URL: http://plaza.rakuten.co.jp/sundaygoods/>.
(Continued)

*Primary Examiner* — Meredith A Long
(74) *Attorney, Agent, or Firm* — Sughrue Mion, PLLC

(57) ABSTRACT

Information related to a privilege is caused to be presented so as to increase the probability that a user purchases a transaction target. An information processing apparatus detects a predetermined operation of a user which is defined as an operation where purchase motivation for a transaction target is higher than that of an operation to display transaction target information related to the transaction target and which is other than an operation of a user which is necessary to purchase in a transaction site where the transaction target can be purchased. When the predetermined operation is detected, the information processing apparatus causes privilege information related to a privilege which is given to the user to be presented on condition that the user purchases the transaction target targeted by the detected operation.

17 Claims, 22 Drawing Sheets

(56) References Cited

U.S. PATENT DOCUMENTS

| | | | |
|---|---|---|---|
| 2003/0172005 A1* | 9/2003 | Hellal | G06Q 30/02 705/14.51 |
| 2008/0021771 A1* | 1/2008 | Wu | G06Q 30/00 705/14.23 |
| 2009/0327064 A1 | 12/2009 | Ku | |
| 2010/0100417 A1* | 4/2010 | Nussel | G06F 17/30867 705/14.23 |
| 2012/0166268 A1* | 6/2012 | Griffiths | G06Q 30/0222 705/14.23 |
| 2012/0259724 A1* | 10/2012 | Raman | G06Q 30/02 705/26.3 |

FOREIGN PATENT DOCUMENTS

| | | |
|---|---|---|
| JP | 2004-240291 A | 8/2004 |
| JP | 2007-072730 A | 3/2007 |
| JP | 2010-009601 A | 1/2010 |
| JP | 2011-186795 A | 9/2011 |

OTHER PUBLICATIONS

International Search Report for PCT/JP2012/076616 dated Nov. 6, 2012.

* cited by examiner

FIG.6A
MEMBER INFORMATION DB 12a

| USER ID |
| --- |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| NUMBER OF HELD POINTS |

FIG.6B
SALE ITEM INFORMATION DB 12b

| SHOP ID |
| --- |
| SALE ITEM ID |
| PRODUCT CODE |
| CATEGORY ID |
| SALE ITEM NAME |
| SALE ITEM IMAGE URL |
| SALE ITEM DESCRIPTION |
| SALE ITEM PRICE |
| SHIPPING FEE INFORMATION |
| POINT GIVING RATE |
| STOCK QUANTITY |
| PRIVILEGE FLAG |
| PRIVILEGE GIVING STOCK QUANTITY |
| DISCOUNT RATE |

FIG.6C
FAVORITES INFORMATION DB 12c

| USER ID |
| --- |
| SHOP ID |
| SALE ITEM ID |
| REGISTRATION DATE AND TIME |

FIG.6D
OPERATION HISTORY DB 12d

| USER ID |
| --- |
| OPERATION DATE AND TIME |
| URL |

FIG.6E
DISPLAYED PRIVILEGE INFORMATION DB 12e

| DISPLAYED PRIVILEGE ID |
| --- |
| DISPLAYED DATE AND TIME |
| USER ID |
| SHOP ID |
| SALE ITEM ID |
| APPLIED DISCOUNT RATE |

FIG.6F
SHOPPING CART INFORMATION DB 12f

| USER ID |
| --- |
| SHOP ID |
| SALE ITEM ID |
| NUMBER OF REGISTERED PIECES |
| PRIVILEGE APPLICATION FLAG |
| APPLIED DISCOUNT RATE |

FIG.6G
PURCHASE HISTORY DB 12g

| ORDER CODE |
| --- |
| PURCHASE DATE AND TIME |
| USER ID |
| SHOP ID |
| SALE ITEM ID |
| PRODUCT CODE |
| NUMBER OF PURCHASED PIECES |
| PURCHASE PRICE |
| PRIVILEGE GIVING FLAG |
| APPLIED DISCOUNT RATE |
| SHIPPING FEE |
| TOTAL SUM OF MONEY |
| NUMBER OF ACQUIRED POINTS |

FIG.18A

SHOPPING CART

410a → SHOP NAME AAA

| PURCHASE | ITEM FOR SALE PUT IN SHOPPING CART | UNIT PRICE | QUANTITY | DELETE |
|---|---|---|---|---|
| ☑ | NOTEBOOK PC XX-XXXXXXXX | 100,000 YEN | 1 | DELETE ← 411 |

PURCHASE PROCEDURE ← 412

410b → SHOP NAME CCC

| PURCHASE | ITEM FOR SALE PUT IN SHOPPING CART | UNIT PRICE | QUANTITY | DELETE |
|---|---|---|---|---|
| ☑ | △△△△ FOLDING UMBRELLA | 3,980 YEN | 1 | DELETE ← 411 |

PURCHASE PROCEDURE ← 412

FIG.18B

SHOPPING CART

420 → SHOPPING CART OF AAA BECOMES EMPTY.

131 — XX% DISCOUNT IF YOU PUT "NOTEBOOK PC XX-XXXXXXXX" IN SHOPPING CART AND COMPLETE ORDER NOW!
132 — QUANTITY [1] [PUT IN SHOPPING CART]

410b → SHOP NAME CCC

| PURCHASE | ITEM FOR SALE PUT IN SHOPPING CART | UNIT PRICE | QUANTITY | DELETE |
|---|---|---|---|---|
| ☑ | △△△△ FOLDING UMBRELLA | 3,980 YEN | 1 | DELETE ← 411 |

PURCHASE PROCEDURE ← 412

INFORMATION PROCESSING APPARATUS, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2012/076616 filed Oct. 15, 2012, claiming priority based on Japanese Patent Application No. 2012-069473, filed Mar. 26, 2012, the contents of all of which are incorporated herein by reference in their entirety.

TECHNICAL FIELD

The present invention relates to a technical field of an information processing apparatus and an information processing method which cause information related to a privilege which is given to a purchaser of a transaction target to be presented.

BACKGROUND ART

In recent years, electronic commerce in which a transaction target such as an item for sale or a service is traded on the Internet is actively performed. In the electronic commerce, for example, a transaction target is searched for based on a condition specified by a user and a search result is displayed on a screen. When the user performs an operation to select a transaction target in which the user is interested from the search result, for example, detailed information of the selected transaction target is displayed. When the user browses the information and then decides to purchase the transaction target, the user performs an operation to proceed to a purchasing procedure. However, even when the user browses the information of the transaction target, the user often does not end up purchasing the transaction target. Therefore, to increase motivation to purchase the transaction target, a technique is disclosed which gives a privilege to a purchaser of the transaction target and presents information related to the privilege to the user.

For example, Patent Literature 1 discloses a technique of causing information about bundle discount to be displayed on a web page such as a sale item simple display, a sale item detailed display, a shopping basket, a sale item search result, a sale item sub-classification, and a seller list.

CITATION LIST

Patent Literature

Patent Literature 1: JP 2010-9601 A

SUMMARY OF INVENTION

Technical Problem

However, even when presenting information of a privilege of a specific item for sale along with a sale item search result, a sale item sub-classification, or a seller list, it is not necessarily possible to sufficiently increase the motivation to purchase the specific item for sale. Further, even when presenting the information of the privilege along with a sale item simple display or a sale item detailed display, the motivation of the user to purchase the item for sale may not increase to a level where the user decides to purchase the item for sale.

The present invention is made in view of the above situation, and an object of the present invention is to provide an information processing apparatus, an information processing method, an information processing program, and a recording medium which cause the information related to the privilege to be presented so as to increase the probability that the user purchases the transaction target.

Solution to Problem

In order to solve the above problem, the invention according to claim 1 is an information processing apparatus comprising: a detection means that detects a predetermined operation of a user which is defined as an operation where purchase motivation for a transaction target is higher than that of an operation to display transaction target information related to the transaction target and which is other than an operation of a user which is necessary to purchase in a transaction site where the transaction target can be purchased; and a presentation means that, when the predetermined operation is detected by the detection means, causes privilege information to be presented on condition that the user purchases the transaction target targeted by the detected operation, the privilege information being related to a privilege which is given to the user.

The purchase motivation of the user when the user performs an operation necessary to purchase the transaction target is increased to a level where the user intends to purchase the transaction target. On the other hand, there is a probability that the purchase motivation of the user when the user performs an operation to display the transaction target information related to the transaction target is motivation at a level where the user is merely interested in the transaction target. According to this invention, by detecting the predetermined operation, it is possible to present the privilege information when the purchase motivation of the user exceeds the level where the user is merely interested in the transaction target. Therefore, it is possible to more increase the probability that the user purchases the transaction target than when the privilege information is presented when the purchase motivation of the user is at the level where the user is merely interested in the transaction target.

The invention according to claim 2 is the information processing apparatus according to claim 1, wherein when an amount of privileges given to the user in a preset time period is greater than or equal to a preset amount, the presentation means does not cause the privilege information to be presented.

According to this invention, when the amount of privileges given to the user so far is greater than or equal to the preset amount, no privilege information is presented. Therefore, it is possible to prevent the user from performing an operation, for which a privilege is given, in order to acquire the privilege. Further, originally unnecessary operations are prevented from being performed, so that it is possible to prevent the processing load of the information processing apparatus from increasing.

The invention according to claim 3 is the information processing apparatus according to claim 1 or 2, wherein the presentation means causes the privilege information including a value of the privilege based on an amount of privileges given to the user in a preset time period to be presented and sets the value of the privilege so that the greater the amount, the smaller the value of the privilege.

According to this invention, the greater the amount of privileges given to the user so far, the lower the value of the privilege to be given is. Therefore, it is possible to prevent the user from performing an operation, for which a privilege is given, in order to acquire the privilege. Further, originally unnecessary operations are prevented from being performed, so that it is possible to prevent the processing load of the information processing apparatus from increasing.

The invention according to claim 4 is the information processing apparatus according to any one of claims 1 to 3, wherein the detection means detects an operation to register a transaction target in a reference list holding a reference to the transaction target information of a registered transaction target.

It is assumed that the purchase motivation of the user increases to exceed the level where the user is merely interested in the transaction target, so that the user performs the operation to register the transaction target in the reference list. According to this invention, the operation to register the transaction target in the reference list is detected, so that it is possible to appropriately identify a time when the purchase motivation of the user exceeds the level where the user is merely interested in the transaction target.

The invention according to claim 5 is the information processing apparatus according to any one of claims 1 to 4, wherein the detection means detects an operation to display a reference list holding a reference to the transaction target information of a transaction target registered by a user.

It is considered that the reason why the user performs the operation to display the reference list is to check transaction targets which the user has registered in the reference list with interest. At this time, the probability that the user considers purchasing any of the transaction targets registered in the reference list is high. According to this invention, the operation to display the reference list is detected, so that it is possible to appropriately identify a time when the purchase motivation of the user exceeds the level where the user is merely interested in the transaction target.

The invention according to claim 6 is the information processing apparatus according to any one of claims 1 to 5, wherein the detection means detects an operation to display the transaction target information of a transaction target registered in a reference list holding a reference to the transaction target information of a transaction target registered by a user as an operation where purchase motivation is higher than that of an operation to display the transaction target information of a transaction target that is not registered in the reference list.

There is a high probability that the user who performs an operation to display the transaction target information of a transaction target that is not registered in the reference list intends to browse the transaction target information with an interest at the level where the user is merely interested in the transaction target. On the other hand, the user registers in the reference list a transaction target for which the user has purchase motivation exceeding the level where the user is merely interested in the transaction target. Therefore, there is a high probability that the user who performs an operation to display the transaction target information of a transaction target that is registered in the reference list intends to actively consider purchasing the transaction target based on the transaction target information. Therefore, it can be considered that the purchase motivation of the user at the time when the user performs the operation to display the transaction target information of a transaction target that is registered in the reference list is higher than the purchase motivation at the time when the user performs the operation to display the transaction target information of a transaction target that is not registered in the reference list. According to this invention, the operation to display the transaction target information of a transaction target that is registered in the reference list is detected, so that it is possible to appropriately identify a time when the purchase motivation of the user exceeds the level where the user is merely interested in the transaction target.

The invention according to claim 7 is the information processing apparatus according to any one of claims 4 to 6, wherein when a preset number of, or more, transaction targets which are the same as the transaction target targeted by the operation detected by the detection means and are sold by sellers different from a seller of the transaction target targeted by the detected operation are registered in the reference list, the presentation means does not cause the privilege information to be presented.

According to this invention, when the number of transaction targets registered in the reference list is greater than or equal to the predetermined number which are the same as the transaction target registered in the reference list by a registration operation at this time, the privilege information is not presented. Therefore, it is possible to prevent the user from performing an operation, for which a privilege is given and which is related to the reference list, in order to acquire the privilege. Further, originally unnecessary operations are prevented from being performed, so that it is possible to prevent the processing load of the information processing apparatus from increasing.

The invention according to claim 8 is the information processing apparatus according to any one of claims 4 to 7, wherein the presentation means causes the privilege information including a value of the privilege based on a number of transaction targets which are the same as the transaction target targeted by the operation detected by the detection means and are sold by sellers different from a seller of the transaction target targeted by the detected operation to be presented, and sets the value of the privilege so that the greater the number, the smaller the value of the privilege.

According to this invention, the greater the number of transaction targets registered in the reference list which are the same as the transaction target registered in the reference list by a registration operation at this time, the lower the value of the privilege to be given. Therefore, it is possible to prevent the user from performing an operation, for which a privilege is given and which is related to the reference list, in order to acquire the privilege. Further, originally unnecessary operations are prevented from being performed, so that it is possible to prevent the processing load of the information processing apparatus from increasing.

The invention according to claim 9 is the information processing apparatus according to any one of claims 4 to 8, wherein when a ratio of purchased transaction targets to transaction targets registered in the reference list is smaller than a preset ratio, the presentation means causes the privilege information to be presented.

According to this invention, when the ratio of purchased items for sale to transaction targets registered in the reference list is low, it is possible to increase the ratio. Therefore, it is possible to prevent the number of purchases of the transaction targets registered in the reference list from decreasing.

The invention according to claim 10 is the information processing apparatus according to any one of claims 4 to 9, wherein the presentation means causes the privilege information including a value of the privilege based on a ratio of purchased transaction targets to transaction targets registered in the reference list to be presented and sets the value of the privilege so that the smaller the ratio, the greater the value of the privilege.

According to this invention, the lower the ratio of purchased items for sale to transaction targets registered in the reference list, the more the ratio can be increased. Therefore, it is possible to prevent the number of purchases of the transaction targets registered in the reference list from decreasing.

The invention according to claim 11 is the information processing apparatus according to any one of claims 1 to 10, wherein the detection means detects an operation to delete a transaction target from a purchase list in which a transaction target selected by a user as a target which the user intends to purchase is registered.

The user registers in the purchase list a transaction target which the user have decided to purchase. Thereafter, the purchase motivation of the user when the user performs an operation to delete the transaction target from the purchase list is decreased from a level where the user determines to purchase the transaction target. However, there is a probability that the purchase motivation of the user at this time is not decreased to a level lower than or equal to the level where the user is merely interested in the transaction target. According to this invention, the operation to delete a transaction target from the purchase list is detected, so that it is possible to appropriately identify a time when the purchase motivation of the user exceeds the level where the user is merely interested in the transaction target. Further, the privilege information is presented when the operation to delete a transaction target from the purchase list is detected, so that it is possible to prevent the user from not purchasing the transaction target due to further decreasing purchase motivation.

The invention according to claim 12 is the information processing apparatus according to claim 11, wherein when a frequency at which the user performs the operation to delete a transaction target from the purchase list is higher than or equal to a preset frequency, the presentation means does not cause the privilege information to be presented.

According to this invention, when the frequency of deletion of a transaction target from the purchase list is higher than or equal to a preset frequency, no privilege information is presented. Therefore, it is possible to prevent the user from performing the operation to delete a transaction target from the purchase list in order to acquire the privilege. Further, originally unnecessary operations are prevented from being performed, so that it is possible to prevent the processing load of the information processing apparatus from increasing.

The invention according to claim 13 is the information processing apparatus according to claim 11 or 12, wherein the presentation means causes the privilege information including a value of the privilege based on a frequency at which the user performs the operation to delete a transaction target from the purchase list to be presented and sets the value of the privilege so that the higher the frequency, the lower the value of the privilege.

According to this invention, the higher the frequency of deletion of a transaction target from the purchase list, the lower the value of the privilege to be given. Therefore, it is possible to prevent the user from performing the operation to delete a transaction target from the purchase list in order to acquire the privilege. Further, originally unnecessary operations are prevented from being performed, so that it is possible to prevent the processing load of the information processing apparatus from increasing.

The invention according to claim 14 is the information processing apparatus according to any one of claims 1 to 13, wherein the detection means detects an operation to request a site different from the transaction site to perform a search using a search condition including identification information for identifying a transaction target whose transaction target information was displayed in the transaction site.

When the user browses transaction target information and then is more interested in a transaction target for which the transaction target information was displayed, the user may want more information related to the transaction target. If a search is performed in a site different from the transaction site by using a search condition including identification information for identifying the transaction target information different from the transaction target information in the transaction site may be able to be found regarding the transaction target. Therefore, there is a high probability that the purchase motivation of the user when the user performs an operation to request such a search exceeds the level where the user is merely interested in the transaction target. According to this invention, the operation to request a site different from the transaction site to perform a search using a search condition including identification information for identifying a transaction target for which the transaction target information is displayed is detected, so that it is possible to appropriately identify a time when the purchase motivation of the user exceeds the level where the user is merely interested in the transaction target.

The invention according to claim 15 is the information processing apparatus according to any one of claims 1 to 14, wherein when a number of remains of transaction target targeted by the operation detected by the detection means is smaller than a preset number, the presentation means does not cause the privilege information to be presented.

There is a probability that a transaction target where the number of remains is small is a fast selling transaction target. Regarding a fast selling transaction target, it is not necessary to promote purchase by even giving a privilege. According to this invention, even when a transaction target for which privilege need not be given is made a target of an operation for which a privilege is given, it is possible to cause the privilege information not to be presented.

The invention according to claim 16 is an information processing method performed by a computer, the method comprising: a detection step detecting a predetermined operation of a user which is defined as an operation where purchase motivation for a transaction target is higher than that of an operation to display transaction target information related to the transaction target and which is other than an operation of a user which is necessary to purchase in a transaction site where the transaction target can be purchased; and a presentation step that, when the predetermined operation is detected in the detection step, causing privilege information to be presented on condition that the user purchases the transaction target targeted by the detected operation, the privilege information being related to a privilege which is given to the user.

The invention according to claim 17 is an information processing program that causes a computer to function as: a detection means that detects a predetermined operation of a user which is defined as an operation where purchase motivation for a transaction target is higher than that of an operation to display transaction target information related to the transaction target and which is other than an operation of a user which is necessary to purchase in a transaction site where the transaction target can be purchased; and a presentation means that, when the predetermined operation is detected by the detection means, causes privilege information to be presented on condition that the user purchases the transaction target targeted by the detected operation, the privilege information being related to a privilege which is given to the user.

The invention according to claim 18 is a recording medium in which an information processing program is computer-readably recorded, the information generation program causing a computer to function as: a detection means that detects a predetermined operation of a user which is defined as an operation where purchase motivation for a transaction target is higher than that of an operation to display transaction target information related to the transaction target and which is other than an operation of a user which is necessary to purchase in a transaction site where the transaction target can be purchased; and a presentation means that, when the predetermined operation is detected by the detection means, causes privilege information to be presented on condition that the user purchases the transaction target targeted by the detected operation, the privilege information being related to a privilege which is given to the user.

Advantageous Effects of Invention

According to the present invention, by detecting the predetermined operation, it is possible to present the privilege information when the purchase motivation of the user exceeds the level where the user is merely interested in the transaction target. Therefore, it is possible to more increase the probability that the user purchases the transaction target than when the privilege information is presented when the purchase motivation of the user is at the level where the user is merely interested in the transaction target.

BRIEF DESCRIPTION OF DRAWINGS

FIG. 6A is a diagram showing an example of content registered in a member information DB 12a. FIG. 6B is a diagram showing an example of content registered in a sale item information DB 12b. FIG. 6C is a diagram showing an example of content registered in a favorites information DB 12c. FIG. 6D is a diagram showing an example of content registered in an operation history DB 12d. FIG. 6E is a diagram showing an example of content registered in a displayed privilege information DB 12e. FIG. 6F is a diagram showing an example of content registered in a shopping cart information DB 12f. FIG. 6G is a diagram showing an example of content registered in a purchase history DB 12g.

FIGS. 18A and 18B are diagrams showing a display example of a shopping cart page.

DESCRIPTION OF EMBODIMENTS

Hereinafter, embodiments of the present invention will be described in detail with reference to the drawings. The embodiments described below are embodiments where the present invention is applied to an information processing system.

Figure 1:
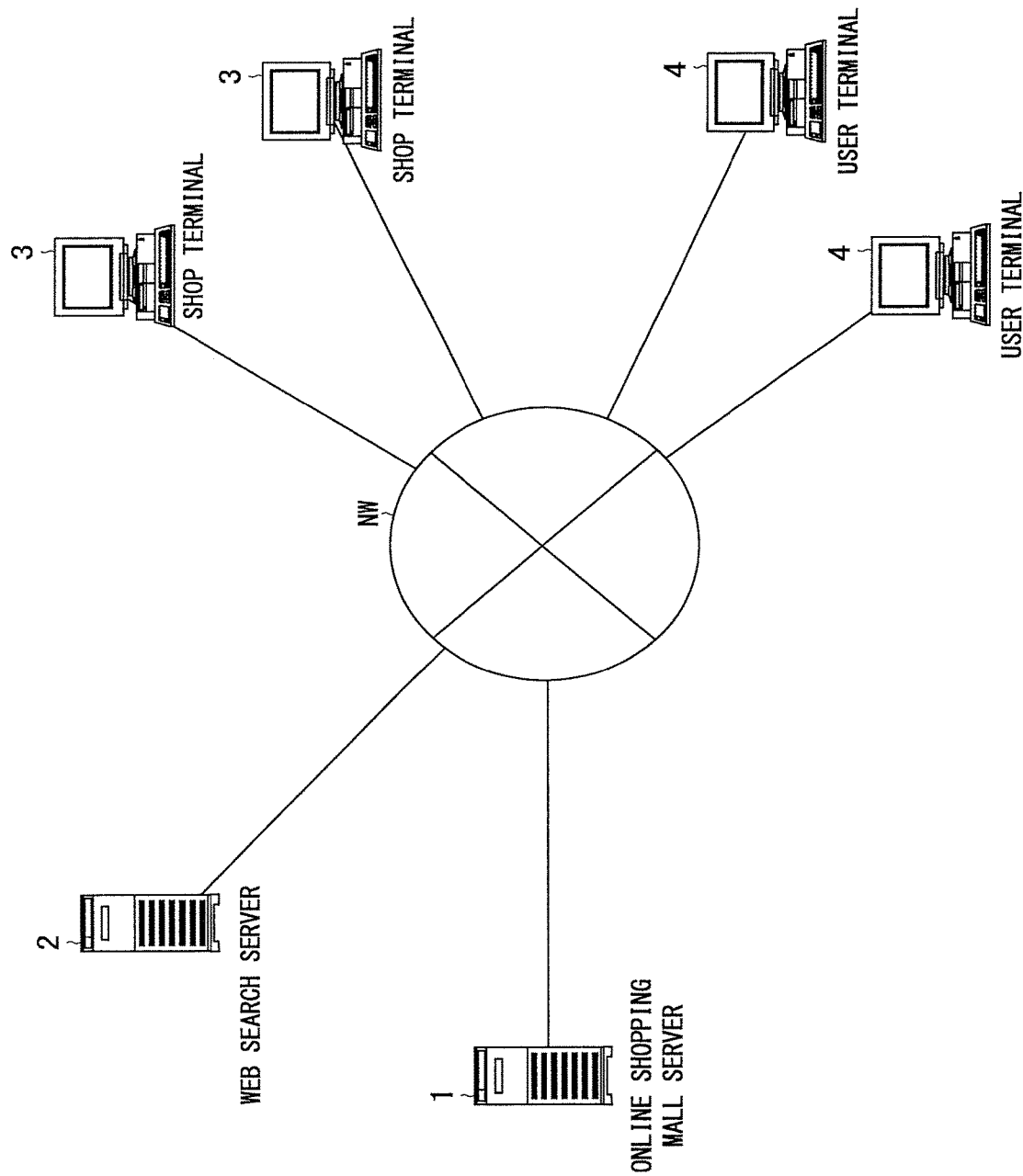
FIG. 1 is a diagram showing an example of a schematic configuration of an information processing system S according to an embodiment.

1. First Embodiment 1-1. Schematic Configuration and Function of Information Processing System First, a configuration of an information processing system S according to the present embodiment will be described with reference to FIG. 1. FIG. 1 is a diagram showing an example of a schematic configuration of the information processing system S according to the present embodiment.

As shown in FIG. 1, the information processing system S includes an online shopping mall server 1, a web search server 2, a plurality of shop terminals 3, and a plurality of user terminals 4. The online shopping mall server 1, the web search server 2, each shop terminal 3, and each user terminal 4 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The online shopping mall server 1 is a server device that performs various processes related to an online shopping mall from which items for sale can be purchased. The online shopping mall server 1 is an example of an information processing apparatus of the present invention. The online shopping mall is an example of a transaction site of the present invention. A user can purchase a desired item for sale from a desired shop by using the online shopping mall. For example, the online shopping mall server 1 transmits a web page of the online shopping mall and performs processes related to a search and a purchase of an item for sale according to a request from the user terminal 4.

The web search server 2 is a server device that performs various processes related to a web search site that searches for web pages. The web search site is an example of a site different from the transaction site in the present invention. The web search server 2 searches for web pages corresponding to a keyword specified by a user according to a request from the user terminal 4. Then, the web search server 2 transmits a search result to the user terminal 4. An administrator of the web search site and an administrator of the online shopping mall may be the same or may be different from each other.

The shop terminal 3 is a terminal device used by an employee or the like of a shop that is open in the online shopping mall. The shop terminal 3 accesses a server device such as the online shopping mall server 1 on the basis of an operation from an employee or the like. Thereby, the shop terminal 3 receives a web page from the server device and displays the web page. In the shop terminal 3, software such as a browser and an email client is installed. For example, an employee registers information of an item for sale to be sold in the online shopping mall and checks content of order of an item for sale by using the shop terminal 3.

The user terminal 4 is a terminal device of a user who uses the online shopping mall. The user terminal 4 receives a web page from the online shopping mall server 1 and displays the web page by accessing the online shopping mall server 1 on the basis of an operation from the user. In the user terminal 4, software such as a browser and an email client is installed. For example, a personal computer, a PDA (Personal Digital Assistant), a mobile information terminal such as a smart-phone, and a mobile phone are used as the user terminal 4.

1-2. Procedure of Purchasing Item for Sale

Figure 2:
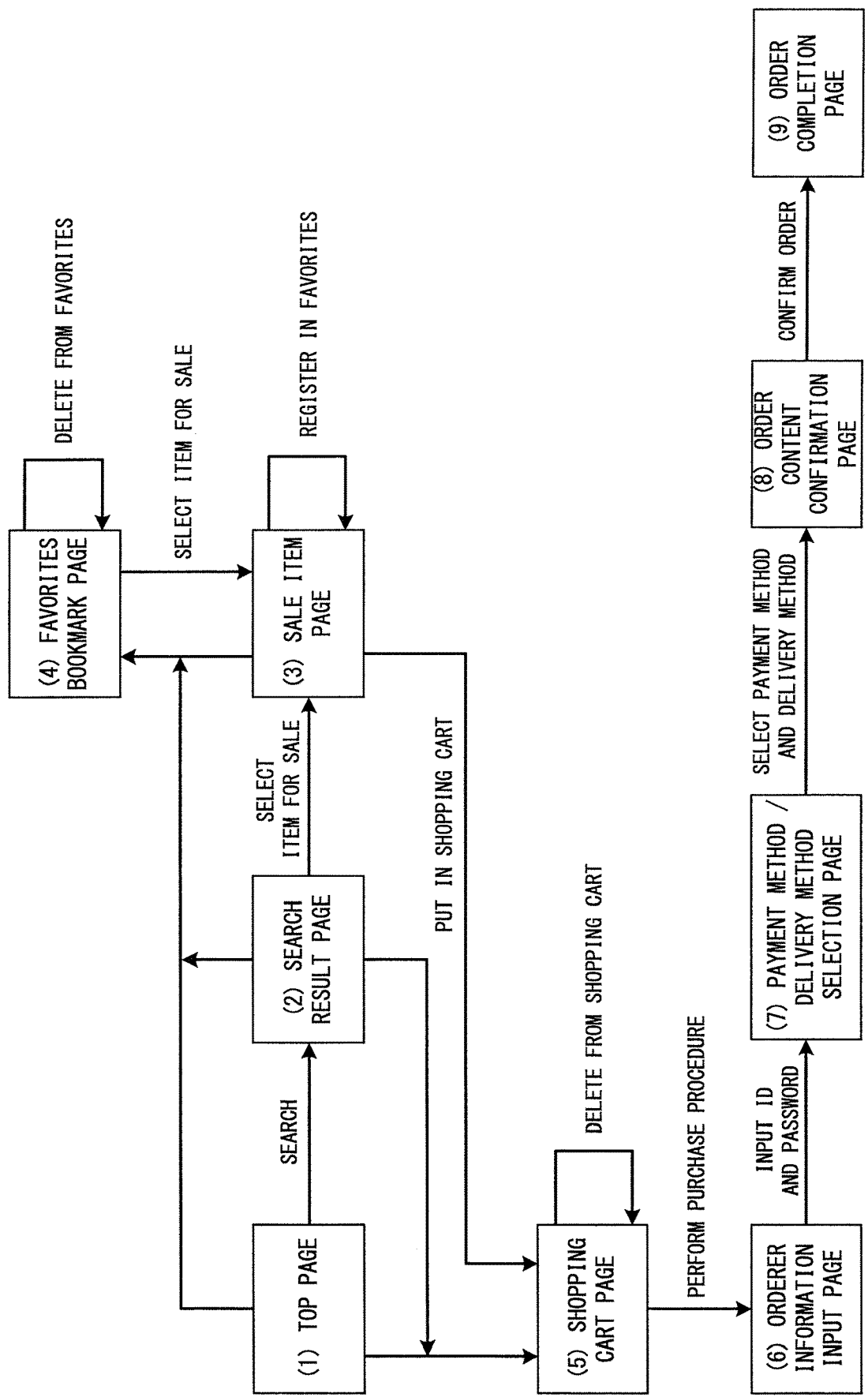
FIG. 2 is a diagram showing an example of transition of web pages in an online shopping mall.

Next, a procedure of purchasing item for sale in the online shopping mall will be described with reference to FIG. 2. FIG. 2 is a diagram showing an example of transition of web pages in the online shopping mall.

When the user sends an URL (Uniform Resource Locator) of the online shopping mall to a browser, as shown in FIG. 2, a top page is displayed on the screen of the user terminal 4 (FIG. 2(1)). The top page is a web page located at the highest level in the online shopping mall. In the top page, a widget for searching for an item for sale, links for moving to various pages, and the like are displayed.

In the top page, the user specifies a search condition. As the search condition, for example, a keyword and a category of item for sale can be specified. When the user selects a button to perform search, a search result page is displayed on the screen (FIG. 2(2)). In a predetermined web page other than the top page, it is possible to perform an operation to search for an item for sale. The search result page is a web page in which a list of found items for sale is displayed. For example, in the search result page, a sale item name, an image of item for sale, a sale item price, a shop name, and the like are displayed for each item for sale.

When the user selects any item for sale in the search result page, a sale item page of the selected item for sale is displayed on the screen (FIG. 2(3)). The sale item page is a web page in which detailed information of one item for sale is displayed. For example, in the sale item page, a sale item name, an image of item for sale, a sale item price, a shop name, a description of item for sale, a method of paying purchase money, a method of delivering an item for sale, a favorites registration button, a shopping cart registration button, and the like are displayed. The sale item page is an example of transaction target information of the present invention.

The favorites registration button is a button to register an item for sale in the user's favorites. In the online shopping mall, a Favorites function is provided. The Favorites function is a function to hold a reference to a sale item page in a Favorites list by registering an item for sale sold in the online shopping mall as a user's favorite so that the user can easily browse the sale item page of the favorite item for sale. The shopping cart registration button is a button to put an item for sale in a shopping cart. The shopping cart is a virtual container in which an item for sale selected by the user as an object to be purchased is put. The shopping cart is also a list in which items for sale selected by the user are registered. The user can purchase items for sale from among the items for sale put in the shopping cart. The operation to put an item for sale in the shopping cart is an operation necessary to purchase the item for sale. The Favorites is an example of a reference list of the present invention. The shopping cart is an example of a purchase list of the present invention.

In the sale item page, if the user selects the favorites registration button, an item for sale corresponding to the displayed sale item page is registered in the Favorites. On a favorites bookmark page, the user can check items for sale registered in the Favorites. The favorites bookmark page is a web page in which a list of items for sale registered in the Favorites is displayed and is a dedicated web page for each user. In various web pages in the online shopping mall, hyperlinks (hereinafter referred to as a "links") to the favorites bookmark page is embedded. When the user selects the link, the favorites bookmark page is displayed on the screen (FIG. 2(4)). In the favorites bookmark page, links to sale item pages of items for sale registered in the Favorites are embedded. When the user selects a link of anyone of the items for sale in the favorites bookmark page, a sale item page of the selected item for sale is displayed on the screen (FIG. 2(3)). In the favorites bookmark page, the user can delete unnecessary items for sale from the Favorites.

In the sale item page, if the user selects the shopping cart registration button, an item for sale corresponding to the displayed sale item page is put in the shopping cart. Then, a shopping cart page is displayed on the screen (FIG. 2(5)). The shopping cart page is a web page that displays a list of items for sale which are put in the shopping cart by the user. In various web pages in the online shopping mall, a link to the shopping cart page is embedded. When the user selects the link, the shopping cart page is displayed. In the shopping cart page, the user can delete items for sale put in the shopping cart from the shopping cart. Further, in the shopping cart page, a purchase procedure button is displayed. The purchase procedure button is a button to perform a procedure to purchase the items for sale put in the shopping cart. The user needs to perform the purchase procedure for each shop.

When the user selects the purchase procedure button in the shopping cart page, an orderer information input page is displayed on the screen (FIG. 2(6)). The orderer information input page is a web page for inputting orderer information related to the user who purchases the items for sale. The orderer information includes a user ID and a password. When the user inputs the orderer information in the orderer information input page, a payment method/delivery method selection page is displayed on the screen (FIG. 2(7)). The payment method/delivery method selection page is a web page for selecting a method of paying the purchase money of the items for sale and a method of delivering the items for sale. In the payment method/delivery method selection page, if the user selects a payment method and a delivery method, an order content confirmation page is displayed on the screen (FIG. 2(8)). The order content confirmation page is a web page in which order content of the items for sale to be purchased is displayed. Further, in the order content confirmation page, an order confirmation button is displayed. The user checks whether or not the order content is correct in the order content confirmation page. Then, when the user selects the order confirmation button, the order of the items for sale is confirmed. Then, an order completion page is displayed on the screen (FIG. 2(9)). The order completion page is a web page in which a message indicating that the order is completed is displayed. In this way, the user can purchase the items for sale.

1-3. Display of Privilege

The online shopping mall gives a privilege to a purchaser who satisfies a certain condition, in order to promote purchase of items for sale. Examples of the types of privilege include a discount of the price, giving points, free delivery of items for sale, and giving a present. Here, the points can be used as purchase money assuming that the points have the same value as money when the user purchases an item for sale in the online shopping mall. For example, one point is assumed to be one yen. Normally, points corresponding to money of a predetermined percentage of the price of the purchased item for sale are given to the purchaser. The points that are given as a privilege are different from the points normally given to the purchaser. In the description below, as a typical privilege, a case in which the price of an item for sale is discounted will be mainly described.

To promote purchase of an item for sale by giving a privilege, it is necessary to make a user know before the user's purchasing the item for sale that the privilege is given. When the user knows that the privilege is given, the motivation of the user to purchase the item for sale increases. Therefore, the online shopping mall server 1 causes the user terminal 4 to present privilege information to the user. Specifically, the online shopping mall server 1 causes the user terminal 4 to display the privilege information on the screen. The privilege information is information related to the privilege. However, the effect of promoting the purchase of the item for sale may be small depending on the timing at which the privilege information is displayed. For example, this is a case in which the user has no purchase motivation for a specific item for sale. Even when the user knows that the user can acquire the privilege if the user purchases the item for sale for which the user has no purchase motivation, normally, the user does not purchase the item for sale. Further, even if the privilege information is displayed in a stage in which the user has some interest in a specific item for sale, it is considered that the probability that the user purchases the item for sale is low. When the privilege information is displayed, the purchase motivation of the user may increase from a level where the user has some interest. However, the difference is large between the purchase motivation at a level where the user is merely interested in the item for sale and the purchase motivation at a level where the user determines to purchase the item for sale. Therefore, it is not easy to increase the purchase motivation of the user to the level where the user determines to purchase the item for sale.

To increase the purchase motivation to the level where the user determines to purchase the item for sale, the online shopping mall server 1 detects an operation where it is assumed that the purchase motivation of the user exceeds the level where the user is merely interested in a specific item for sale. This operation is referred to as a "privilege giving target operation". The privilege giving target operation is an example of a predetermined operation of the present invention. The online shopping mall server 1 causes the privilege information related to a privilege which is given on condition that the privilege giving target operation is performed to be displayed for the first time at the timing when detecting the privilege giving target operation. When the purchase motivation of the user exceeds the level where the user is merely interested in a specific item for sale, the difference between the purchase motivation at this time and the purchase motivation at the level where the user determines to purchase the item for sale is smaller than the difference between the purchase motivation at the level where the user is merely interested in the item for sale and the purchase motivation at the level where the user determines to purchase the item for sale. If the privilege information is displayed in this stage, it is possible to increase the probability that the purchase motivation of the user increases to the level where the user determines to purchase the item for sale.

The condition to give the privilege to the purchaser is to perform the privilege giving target operation. If the user can acquire the privilege even when the user does not perform the privilege giving target operation, it is not necessary to display the privilege information for the first time at the timing when the privilege giving target operation is detected. For example, the privilege information may be displayed in a sale item page. When there is no condition to give the privilege, it cannot be said that displaying the privilege information at the timing when the privilege giving target operation is detected is more effective for increasing the purchase motivation than causing the privilege information to be displayed at different timing.

For example, it is assumed that the privilege information indicating that the privilege is given if the privilege giving target operation is performed is displayed in a stage before the privilege giving target operation is detected. Then, the user knows, before performing the privilege giving target operation, that the user can acquire the privilege by performing the privilege giving target operation. In this case, it is assumed that the user intends to secure only the privilege and performs the privilege giving target operation regardless of the presence or absence of the actual purchase motivation. Then, the number of the cases in which the purchase motivation of the user when the user performs the privilege giving target operation does not exceed the level where the user is merely interested in a specific item for sale increases. Therefore, the effect of promoting the purchase of the item for sale by displaying the privilege information decreases. When the information of the privilege given on condition that the privilege giving target operation is performed is displayed for the first time at the timing when the privilege giving target operation is detected, the purchase of the item for sale can be promoted.

Whether or not an operation is the privilege giving target operation is determined based on an operation where the purchase motivation of the user is assumed to be the level where the user is merely interested in a specific item for sale. As the operation where the purchase motivation is assumed to be the level where the user is merely interested in the item for sale, there is an operation to display the sale item page. For example, the user selects an item for sale in which the user is interested in a search result page and causes the sale item page to be displayed. However, many of the items for sale whose sale item page is displayed are eventually not purchased. An example of the reason of the above is that even when the user checks information of the item for sale in the sale item page, the purchase motivation is not increased from the level where the user is merely interested in the item for sale to the level where the user determines to purchase the item for sale. Further, when the user checks the information of the item for sale in the sale item page, the user may lose the purchase motivation. When the user performs an operation to display the sale item page, there are various levels of the purchase motivation of the user. However, it is difficult to determine the level of the purchase motivation of the user in a stage in which the sale item page is displayed. The lowest level of the purchase motivation considered to be held by the user in a stage in which the user has performed the operation to display the sale item page is the level where the user is merely interested in the item for sale. Therefore, the operation to display the sale item page is assumed to be an operation where the purchase motivation is at the level where the user is merely interested in the item for sale.

For example, an operation to display the top page or the search result page is not assumed to be an operation where the purchase motivation is higher than that of the operation to display the sale item page. This is because when these operations are performed, the probability that the user has a motivation to purchase a specific item for sale is low.

An operation necessary to purchase an item for sale whose sale item page is displayed is an operation where the purchase motivation is higher than that of the operation to display the sale item page. However, the operation necessary to purchase the item for sale is not assumed to be the privilege giving target operation. The reason of this is that the user performs the operation necessary to purchase the item for sale because the user has decided to purchase the item for sale. When the user has decided to purchase the item for sale, it is not necessary to further increase the purchase motivation of the user. If the operation necessary to purchase the item for sale is included in the privilege giving target operation, the condition to give the privilege to the purchaser of the item for sale is to perform the operation necessary to purchase the item for sale. However, this condition is substantially the same as the condition to purchase the item for sale. Therefore, the condition to perform the operation necessary to purchase the item for sale is not suitable for the condition to give the privilege.

The operation necessary to purchase the item for sale includes selecting the shopping cart registration button in the sale item page, selecting the purchase procedure button in the shopping cart page, inputting the orderer information in the orderer information page, inputting the payment method and the delivery method in the payment method/delivery method selection page, and selecting the order confirmation button in the order content confirmation page. Information having the same content as that of the privilege information displayed at the timing when the privilege giving target operation is detected may be displayed in the shopping cart page, the orderer information page, the payment method/delivery method selection page, the order content confirmation page, or the order completion page. The timing at which the privilege information is for the first time displayed is important.

In the present embodiment, as an example of the privilege giving target operation, the online shopping mall server 1 causes the privilege information to be displayed when detecting an operation to register an item for sale in the Favorites. For example, when the user checks the information of the item for sale in the sale item page and then registers in the Favorites an item for sale which the user determines to be a candidate for an item for sale to be purchased, an item for sale which the user hesitates about whether or not to purchase and the like. It can be said that the purchase motivation of the user at this time is higher than the purchase motivation at the level where the user is merely interested in the item for sale. The purchase motivation that is once heightened may decrease as the time elapses. Therefore, when the privilege information is displayed at the timing when the user registers an item for sale in the Favorites, it is possible to promote the purchase of the item for sale.

Figure 3:
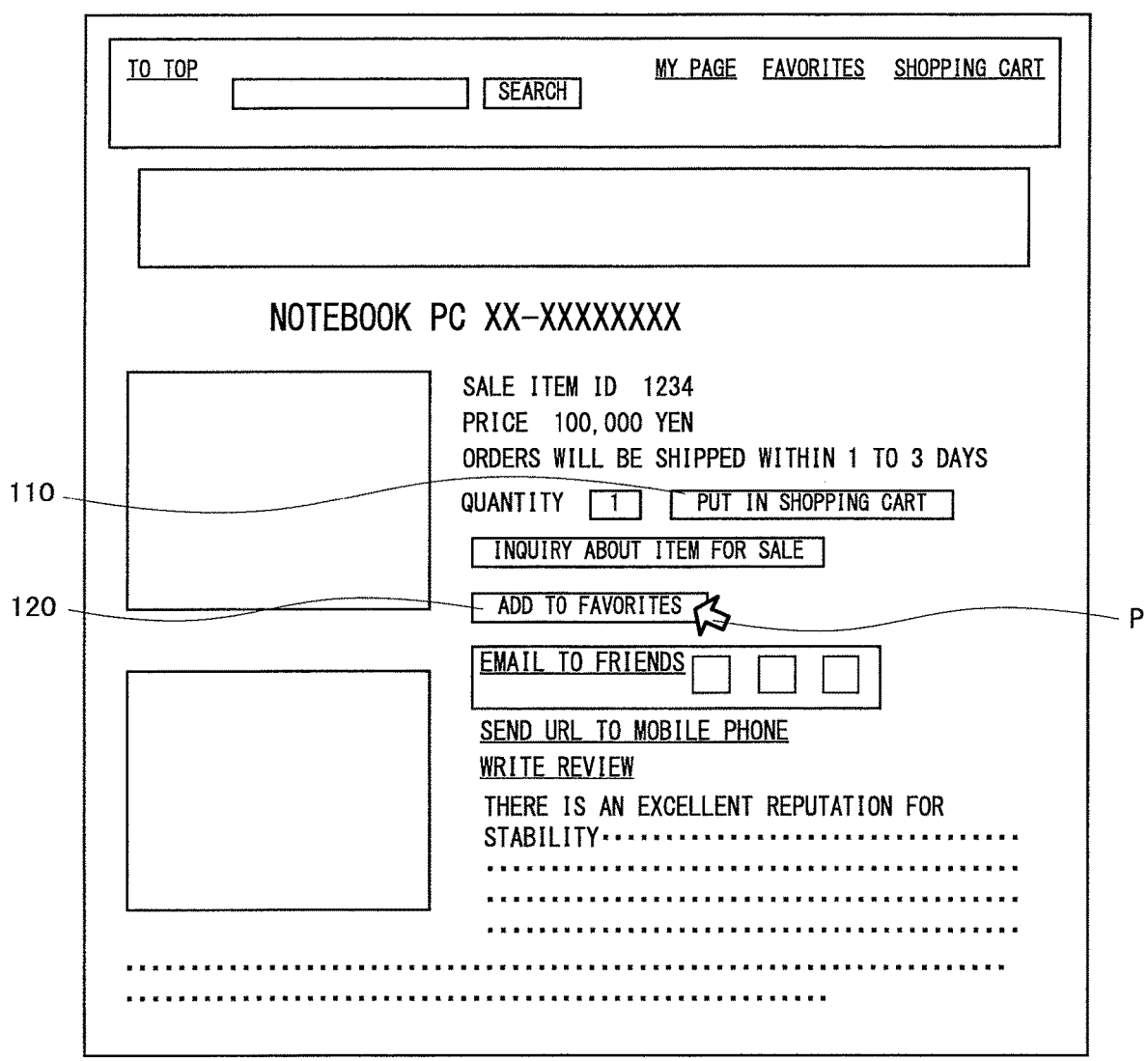
FIG. 3 is a display example of a sale item page.
Figure 4A:
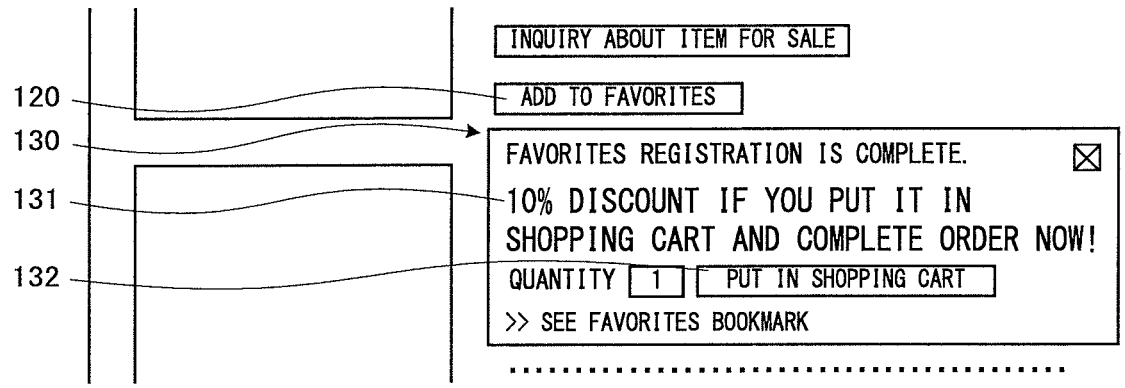
FIGS. 4A and 4B are display examples of privilege information.
Figure 4B:
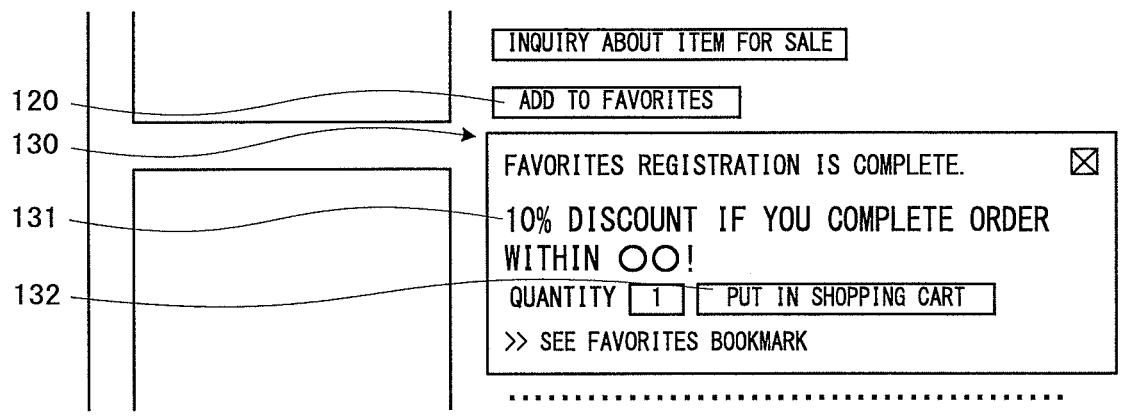

FIG. 3 is a display example of the sale item page. FIGS. 4A and 4B are display examples of the privilege information. In FIGS. 4A and 4B, the same components as those in FIG. 3 are denoted by the same reference numerals. As shown in FIG. 3, the sale item page of a sale item X whose sale item name is "Notebook PC XX-XXXXXXXX" is displayed. In the sale item page, a shopping cart registration button 110, a favorites registration button 120, and the like are displayed. It is assumed that the user selects the favorites registration button 120 in the sale item page. In FIG. 3, the symbol P is a mouse pointer. Then, as shown in FIG. 4A, a favorites registration completion display area 130 is displayed in the sale item page. In the favorites registration completion display area 130, a message indicating that the registration to the Favorites is completed is displayed. Further, in the favorites registration completion display area 130, privilege information 131 and a shopping cart registration button 132 are displayed. As the privilege information 131, for example, "XX % discount if you put it in the shopping cart and complete the order now!" is displayed. In the present embodiment, the privilege information includes information indicating the operation necessary to acquire the privilege, the type of the privilege, and the value of the privilege. Here, it is assumed that the user selects the shopping cart registration button 132. Then, the sale item X is put in the shopping cart and the shopping cart page is displayed. When the user completes the purchase procedure of the sale item X, the privilege is given to the user. The user can purchase the sale item X whose original price is 100,000 yen for 90,000 yen.

The user can cause the favorites registration completion display area 130 to disappear from the sale item page. When the screen changes from the sale item page to another web page and then the same sale item page is displayed again, the favorites registration completion display area 130 is not displayed. It is assumed that after the user registers the sale item X in the Favorites, the user selects the shopping cart registration button 110 in a state in which the favorites registration completion display area 130 is not displayed. Also in this case, the sale item X is put in the shopping cart. In this case, even when the user completes the purchase procedure of the sale item X, no privilege is provided to the user. The purpose of displaying the privilege information is to increase the purchase motivation to the level where the user determines to purchase the item for sale by seeing the privilege information. When the user does not select the shopping cart registration button 132, there is a probability that the purchase motivation is not increased to the level where the user determines to purchase the item for sale by seeing the privilege information. Thereafter, the user determines to purchase the item for sale, so that the user selects the shopping cart registration button 110. However, in this case, there is a probability that the reason why the purchase motivation is increased to the level where the user determines to purchase the item for sale is other than the fact that the user sees the privilege information. Therefore, in this case, it is not necessary to give the privilege to the user. Whether or not to give the privilege to the user when the user selects the shopping cart registration button 110 in a state in which the privilege information 131 is displayed is at the discretion of an administrator of the online shopping mall.

Even when the user determines to purchase the item for sale by seeing the privilege information, the user may later put the item for sale which the user determines to purchase in the shopping cart. Therefore, for example, the online shopping mall server 1 may perform processing so that the privilege is given if the purchase procedure is completed in a predetermined period of time from when the privilege information is displayed. In this case, as shown in FIG. 4B, for example, the privilege information 131 "XX % discount if you complete the order within ○○!" is displayed in the favorites registration completion display area 130. "○○" indicates a time, the number of days, or the like corresponding to the purchase time limit. Even after the favorites registration completion display area 130 is removed, the user can acquire the privilege by selecting the shopping cart registration button 110 and completing the purchase procedure by the purchase time limit. In this case, whether or not to display the shopping cart registration button 132 in the favorites registration completion display area 130 is at the discretion of an administrator.

A shop can set whether or not to give the privilege for each item for sale. Therefore, the privilege information is displayed only for items for sale which are set to give the privilege. The shop can set the value of the privilege to be given for each item for sale. Whether or not to give the privilege can be set for each shop. All items for sale sold in the online shopping mall may be a target for which the privilege is given.

When the privilege is a discount of the sale item price, the value of the privilege is a discount rate or a discount price. When the privilege is points, the value of the privilege is a point giving rate or the number of points. The point giving rate is a ratio of the number of given points with respect to the sale item price. When the privilege is a present, the value of the privilege is at least one of the value of a thing to be presented and the number of things to be presented.

When a stock quantity of an item for sale is small, the online shopping mall server 1 may perform processing so that no privilege is given to the purchaser of the item for sale. When the stock quantity of an item for sale is small, there is a probability that the item for sale is a fast selling item. Therefore, even if no privilege is given to the purchaser, it can be expected that the item for sale will be sold. In this case, the online shopping mall server 1 does not cause the privilege information to be displayed. The minimum value of the stock quantity of an item for sale for which the privilege is given may be set by a shop. The stock quantity is an example of a number of remains of transaction targets of the present invention.

By the way, a user who knows that the user can acquire the privilege by performing the privilege giving target operation may perform the privilege giving target operation in order to acquire the privilege. For example, this is a case in which the user performs the purchase procedure of the item for sale after performing the privilege giving target operation even though the user have determined to purchase the item for sale. In this case, displaying the privilege information does not cause the effect of increasing the purchase motivation of the user. In other words, the purpose of displaying the privilege information is not achieved. It can be considered that every time such a user purchases an item for sale, the user performs the purchase procedure of the item for sale after performing the privilege giving target operation. Therefore, the user acquires the privilege many times. Therefore, the online shopping mall server 1 controls the giving of the privilege and the displaying of the privilege information based on the amount of privileges given to the user in a preset period in the past. The amount of the given privileges is referred to as the "given amount of privileges". The given amount of privileges is at least one of the number of times when the privilege is given and the sum of the values of the given privileges.

Specifically, when the given amount is greater than or equal to a preset amount, the online shopping mall server 1 may give no privilege and may display no privilege information. The online shopping mall server 1 may set the privilege so that the greater the given amount, the lower the value of the privilege to be given, and may display the privilege information according to the value of the privilege. When the given amount is smaller than the set amount, the online shopping mall server 1 may set the value of the privilege to a constant value, and when the given amount is greater than or equal to the set amount, the online shopping mall server 1 may set the privilege so that the greater the amount of privileges, the lower the value of the privilege to be given. Alternatively, when the given amount is greater than or equal to the set amount, the online shopping mall server 1 may give no privilege, and when the given amount is smaller than the set amount, the online shopping mall server 1 may set the privilege so that the greater the amount of privileges, the lower the value of the privilege to be given. By the processing as described above, it is possible to prevent the user from performing the privilege giving target operation in order to acquire the privilege. The privilege giving target operation, which is performed in order to acquire a privilege, is basically an unnecessary operation. If the user terminal 4 transmits a request to the online shopping mall server 1 every time the user performs the unnecessary operation, the processing load of the online shopping mall server 1 increases. However, the unnecessary operation is prevented from being performed, so that it is possible to prevent the processing load of the online shopping mall server 1 from increasing.

1-4. Configuration of Online Shopping Mall Server

Next, a configuration of the online shopping mall server 1 will be described with reference to FIGS. 5 and 6.

Figure 5:
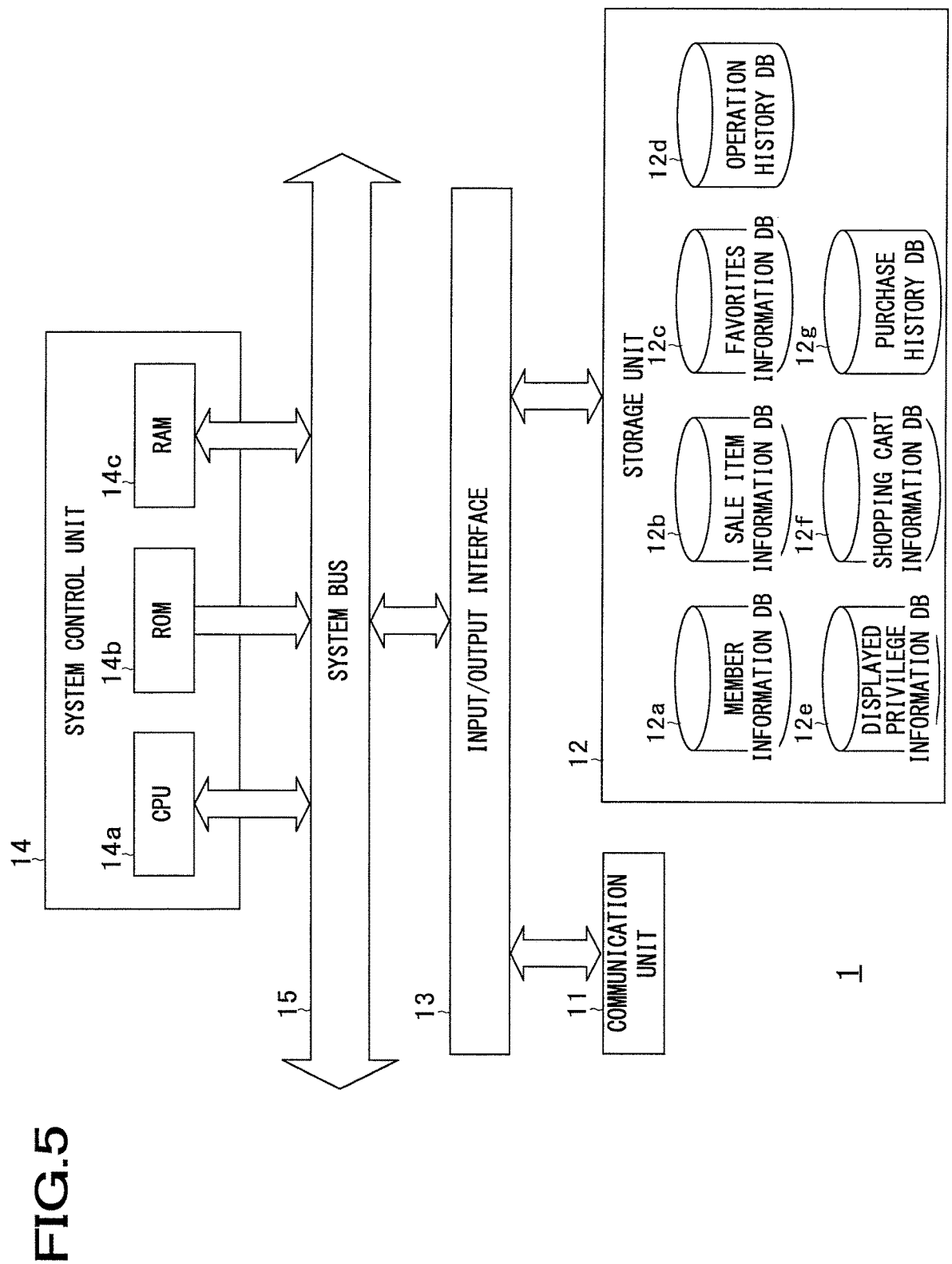
FIG. 5 is a block diagram showing an example of a schematic configuration of an online shopping mall server 1 according to the embodiment.

FIG. 5 is a block diagram showing an example of a schematic configuration of the online shopping mall server 1 according to the present embodiment. As shown in FIG. 5, the online shopping mall server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the shop terminal 3 and the user terminal 4.

The storage unit 12 includes, for example, a hard disk drive and the like. In the storage unit 12, databases such as a member information DB 12*a*, a sale item information DB 12*b*, a favorites information DB 12*c*, an operation history DB 12*d*, a displayed privilege information DB 12*e*, a shopping cart information DB 12*f*, a purchase history DB 12*g* are constructed. The "DB" is an abbreviation of database.

FIG. 6A is a diagram showing an example of content registered in the member information DB 12*a*. In the member information DB 12*a*, member information related to users registered in the information processing system S as a member is registered. Specifically, in the member information DB 12*a*, user attributes such as a user ID, a password, a nickname, a name, a date of birth, a gender, a postal code, an address, a phone number, an email address, and the number of held points are registered in association with each other for each user. The number of held points is the number of points held by the user.

FIG. 6B is a diagram showing an example of content registered in the sale item information DB 12*b*. In the sale item information DB 12*b*, sale item information related to the items for sale sold in the online shopping mall is registered. The sale item information is information registered by a shop. Specifically, in the sale item information DB 12*b*, attributes of item for sale, such as a shop ID, a sale item ID, a product code, a category ID, a sale item name, a URL of a sale item image, a sale item description, a sale item price, shipping fee information, a point giving rate, a stock quantity, a privilege flag, a privilege giving stock quantity, and a discount rate are registered in association with each other for each item for sale sold by a shop. The shop ID is identification information of a shop which is a seller of an item for sale. The sale item ID is identification information of the item for sale for the shop to manage the item for sale sold by the shop. A combination of the shop ID and the sale item ID corresponds to a sale item page on one-to-one basis. The product code is a code number to identify the item for sale. When the same items for sale are sold by a plurality of shops, the same product code is given to each item for sale. As an item for sale code, for example, there is JAN code (Japanese Article Number Code). The category ID is identification information of a category to which the item for sale belongs. The sale item name is a name of the item for sale given by the shop. Therefore, the sale item name may be different from an official name of the item for sale. The shipping fee information is information used to calculate the shipping fee of the item for sale. For example, in the shipping fee information, a corresponding shipping fee is set for each prefecture to which the item for sale is delivered. The privilege flag is information indicating whether or not a privilege is given to a user who performs the privilege giving target operation. The privilege flag is set to ON or OFF. ON indicates that the privilege is given. OFF indicates that no privilege is given. The privilege giving stock quantity indicates the minimum value of stock quantity for which the privilege is given. The discount rate is the maximum discount rate of the sale item price for the user who performs the privilege giving target operation. The actual discount rate is determined within a range smaller than or equal to the discount rate set in the sale item information. The sale item ID, the sale item name, the sale item description, the sale item price, and the like included in sale item information are information displayed in the sale item page.

FIG. 6C is a diagram showing an example of content registered in the favorites information DB 12*c*. In the favorites information DB 12*c*, favorites information related to user's favorites is registered. Specifically, in the favorites information DB 12*c*, a user ID, a shop ID, a sale item ID, a registration date and time, and the like are registered in association with each other for each item for sale registered in the Favorites. The user ID indicates a user who performs registration in the Favorites. The shop ID indicates a shop which is a seller of the item for sale registered in the Favorites. The sale item ID indicates the item for sale registered in the Favorites. The shop ID and the sale item ID are information corresponding to a reference to the sale item page of the item for sale registered in the Favorites. While the actual reference information to the sale item page is a URL, the URL of the sale item page can be identified from the shop ID and the sale item ID. The URL of the sale item page may be registered in the favorites information DB 12*c* along with the shop ID and the sale item ID or instead of the shop ID and the sale item ID. The registration date and time indicates the date and time at which the registration in the Favorites is performed.

FIG. 6D is a diagram showing an example of content registered in the operation history DB 12*d*. In the operation history DB 12*d*, operation histories of the user in the online shopping mall are registered. Specifically, in the operation history DB 12*d*, a user ID, an operation date and time, a URL, and the like are registered. The operation history is registered every time the online shopping mall server 1 receives a request transmitted from the user terminal 4 by an operation of the user. The user ID indicates the user who performs the operation. The operation date and time indicates the date and time at which the operation is performed. The URL is a URL set in the request transmitted from the user terminal 4. The online shopping mall server 1 can identify the operation performed by the user, the item for sale for which the operation is performed, and the like from the URL set in the request.

FIG. 6E is a diagram showing an example of content registered in the displayed privilege information DB 12*e*. In the displayed privilege information DB 12*e*, displayed privilege information related to the privilege whose privilege information is displayed on the screen of the user terminal 4 is registered. Specifically, in the displayed privilege information DB 12*e*, a displayed privilege ID, a displayed date and time, a user ID, a shop ID, a sale item ID, and an applied discount rate are displayed every time the privilege information is displayed. The displayed privilege ID is privilege identification information issued every time the privilege information is displayed. The displayed date and time indicates the date and time at which the privilege information is displayed. The user ID indicates the user to whom the privilege is given. The shop ID indicates a seller of the item for sale for which the privilege is given. The sale item ID indicates the item for sale for which the privilege is given. The applied discount rate is a discount rate applied as the privilege when the item for sale is purchased.

FIG. 6F is a diagram showing an example of content registered in the shopping cart information DB 12*f*. In the shopping cart information DB 12*f*, shopping cart information related to the shopping cart is registered. Specifically, in the shopping cart information DB 12*f*, a user ID, a shop ID, a sale item ID, the number of registered pieces, a privilege application flag, and an applied discount rate are registered for each item for sale put in the shopping cart. The user ID indicates a user who puts the item for sale in the shopping cart. The shop ID indicates a shop of a seller of the item for sale put in the shopping cart. The sale item ID indicates the item for sale put in the shopping cart. The number of registered pieces indicates the number of pieces of the item for sale put in the shopping cart. The privilege application flag is information indicating whether or not the item for sale put in the shopping cart is a target of the privilege. The privilege application flag is set to ON or OFF. ON indicates that the item for sale is a target of the privilege. OFF indicates that the item for sale is not a target of the privilege. The applied discount rate is a discount rate applied as the privilege when the item for sale put in the shopping cart is purchased.

FIG. 6G is a diagram showing an example of content registered in the purchase history DB 12g. In the purchase history DB 12g, a purchase history of items for sale purchased by a user is registered. Specifically, in the purchase history DB 12g, an order code, a purchase date and time, a user ID, a shop ID, a sale item. ID, a product code, the number of purchased pieces, a purchase price, a privilege giving flag, an applied discount rate, a shipping fee, a total sum of money, the number of acquired points, and the like are registered in association with each other for each purchase of item for sale. The order code is identification information of an order given each time an item for sale is ordered. The user ID indicates a purchaser. The shop ID indicates a shop from which the item for sale is purchased. The sale item ID and the product code indicate a purchased item for sale. The number of purchased pieces indicates the number of pieces of the purchased item for sale. The purchase price indicates an amount of money corresponding to the sale item price paid by the purchaser. When a privilege of discount is given, the purchase price is a discounted price. The privilege giving flag is information indicating whether or not the purchased item for sale is a target of the privilege. The privilege giving flag is set to ON or OFF. ON indicates that the item for sale is a target of the privilege. OFF indicates that the item for sale is not a target of the privilege. The applied discount rate is a discount rate applied as a privilege. When a plurality of items for sale different from each other are purchased in the same shop, the sale item ID, the product code, the number of purchased pieces, the purchase price, the privilege giving flag, and the applied discount rate are set for each item for sale. The total sum of money is a sum of the purchase price and the shipping fee. The number of acquired points is the number of points acquired by the purchaser when the item for sale is purchased.

Next, other information stored in the storage unit 12 will be described. The storage unit 12 stores various data such as HTML (HyperText Markup Language) documents, XML (Extensible Markup Language) documents, image data, text data, and electronic documents, for displaying web pages. The storage unit 12 also stores various setting values.

Further, the storage unit 12 stores various programs such as an operating system, a WWW (World Wide Web) server program, a DBMS (Database Management System), and an electronic commerce management program. The electronic commerce management program is a program for performing various processes related to the electronic commerce. The electronic commerce management program is an example of an information processing program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as a detection means and a presentation means.

The online shopping mall server 1 may include a plurality of server devices. For example, a server device that performs processes such as search and order of an item for sale in the online shopping mall, a server device that transmits a web page in response to a request from the user terminal 4, a server device that manages databases, and the like may be connected to each other by a LAN or the like.

1-5. Operation of Information Processing System

Next, an operation of the information processing system S will be described with reference to FIGS. 7 to 9. In the description below, the "operation user" indicates a user who performs an operation. The "target sale item" indicates an item for sale which is a target of operation of a user. The operation example described below is an operation example of a case in which the privilege is given only when a user purchases an item for sale by selecting the shopping cart registration button 132. Further, the operation example described below is an operation example of a case in which the number of times when the privilege is given is applied as the given amount of privileges in a set period. Further, the operation example described below is an operation example of a case in which the number of times when the privilege is given is used for both determining whether or not to give the privilege and deciding the value of the privilege.

Figure 7:
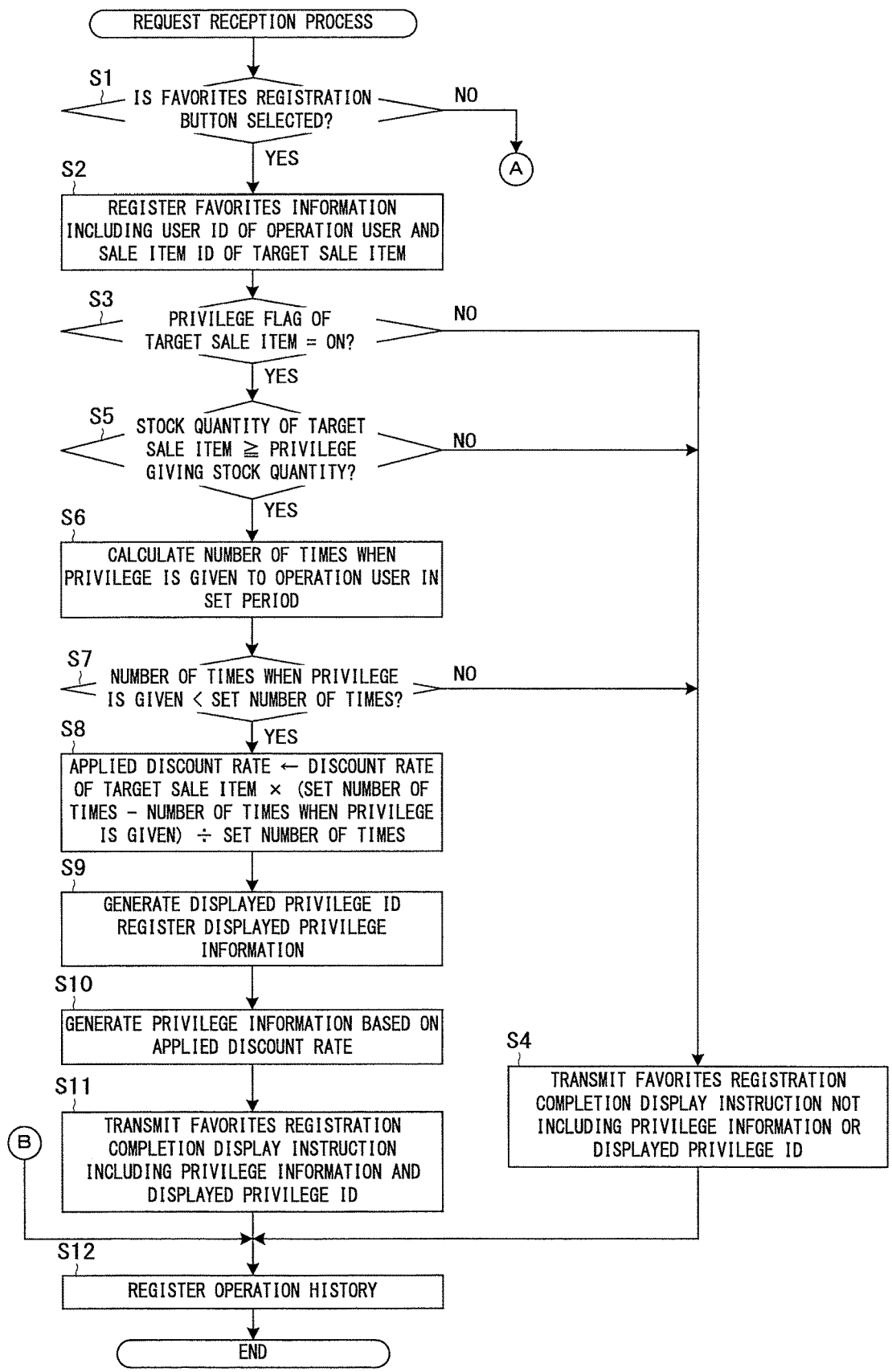
FIG. 7 is a flowchart showing a process example of a request reception process of a system control unit 14 of the online shopping mall server 1 according to the embodiment.
Figure 8:
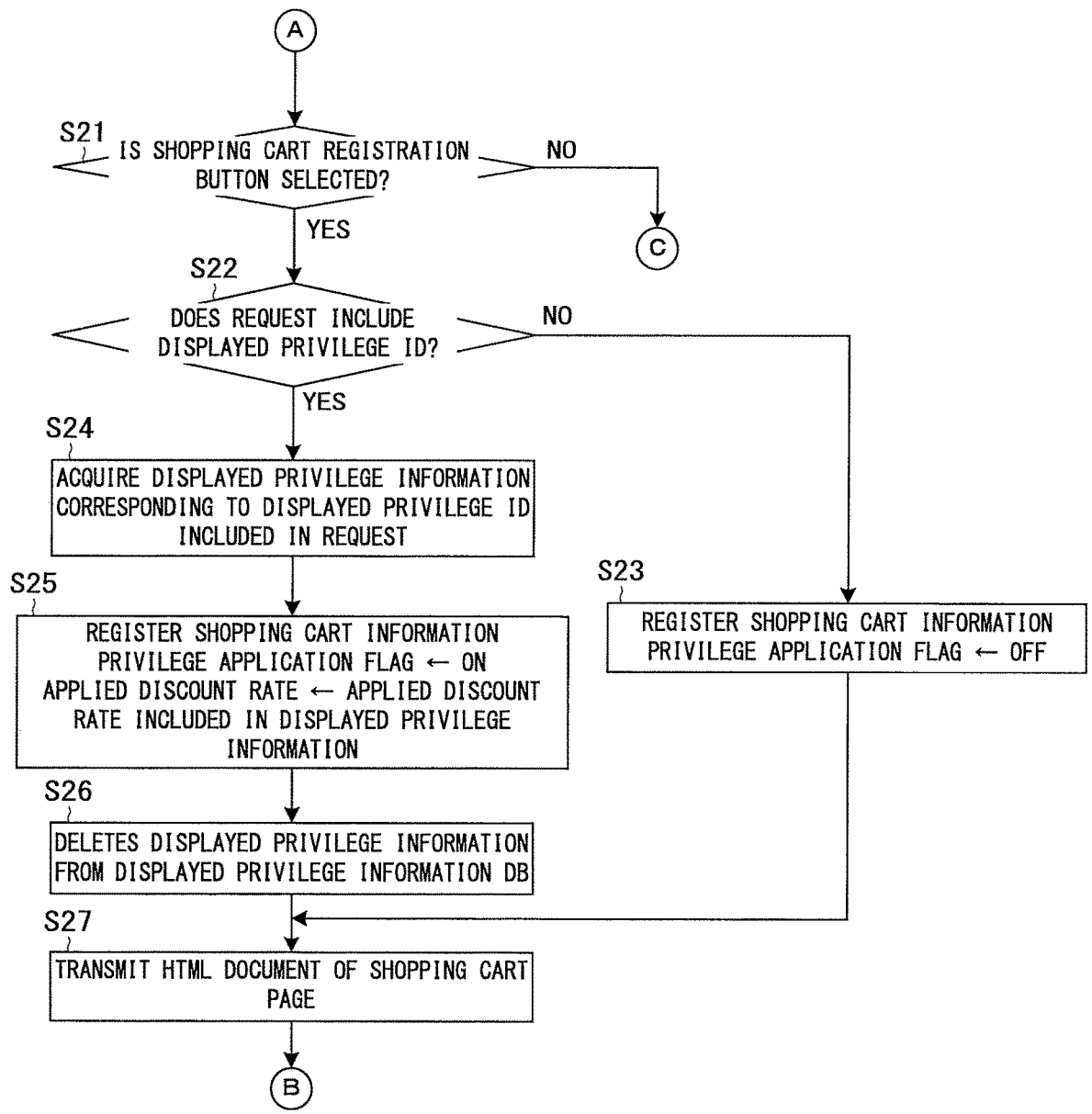
FIG. 8 is a flowchart showing a process example of the request reception process of the system control unit 14 of the online shopping mall server 1 according to the embodiment.
Figure 9:
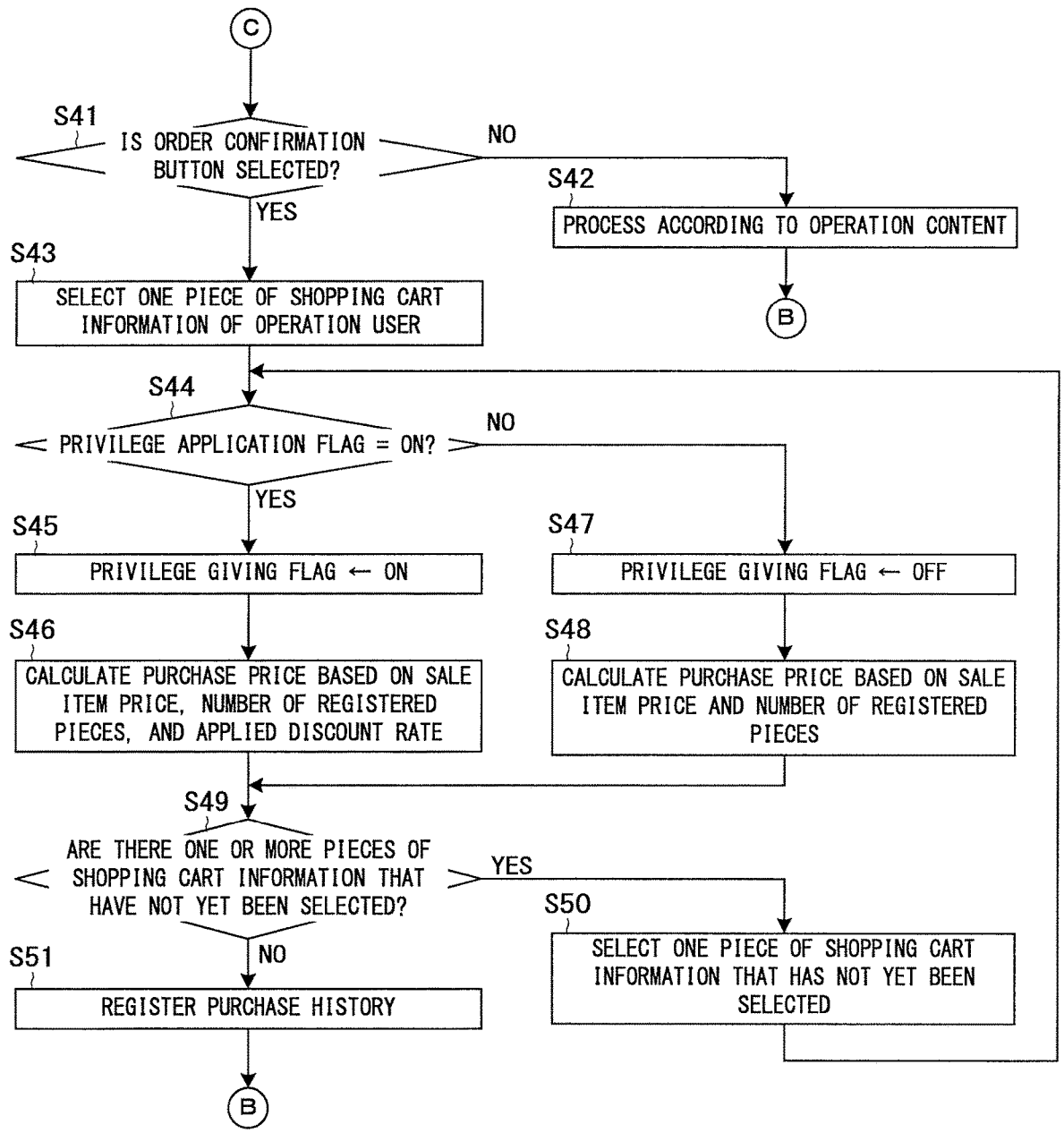
FIG. 9 is a flowchart showing a process example of the request reception process of the system control unit 14 of the online shopping mall server 1 according to the embodiment.

FIGS. 7 to 9 are a flowchart showing a process example of a request reception process of the system control unit 14 of the online shopping mall server 1 according to the present embodiment. The request reception process is performed each time the online shopping mall server 1 receives a request from the user terminal 4. The online shopping mall server 1 determines content of operation performed by the user on the basis of a URL set in the received request. Then, the online shopping mall server 1 performs a process according to the determined content of operation.

As shown in FIG. 7, the system control unit 14 determines whether or not an operation to select the favorites registration button is performed (step S1). At this time, as a detection means, if the system control unit 14 determines that the operation to select the favorites registration button is performed (step S1: Yes), the system control unit 14 registers favorites information (step S2). For example, when the user logs in to the information processing system S, the online shopping mall server 1 receives a user ID from the user terminal 4 and causes the user terminal 4 to store the received user ID as a cookie. Therefore, when the user logs in, a cookie including the user ID of the operation user is added to the request transmitted from the user terminal 4 to the online shopping mall server 1. Therefore, the system control unit 14 acquires the user ID of the operation user from the request. In the case of the operation to select the favorites registration button, the item for sale that is registered in the Favorites is the target sale item. When the user selects the favorites registration button, the user terminal 4 transmits a request in which a URL including the shop ID and the sale item ID of the item for sale corresponding to the sale item page displayed on the screen is set. Then, the system control unit 14 acquires the shop ID and the sale item ID of the target sale item from the request. The system control unit 14 registers favorites information including the acquired user ID, shop ID, and sale item ID in the favorites information DB 12c.

Next, the system control unit 14 acquires the sale item information including the shop ID and the sale item ID of the target sale item from the sale item information DB 12b. Then, the system control unit 14 determines whether or not the privilege flag of the target sale item is ON (step S3). At this time, if the system control unit 14 determines that the privilege flag is OFF (step S3: NO), the system control unit 14 transmits a favorites registration completion display instruction as a response to the request to the user terminal 4 that is the transmitter of the request (step S4). The favorites registration completion display instruction is a message indicating an instruction to cause the favorites registration completion display area 130 to be displayed. At this time, the system control unit 14 does not include the privilege information or the displayed privilege ID in the favorites registration completion display instruction. In other words, the system control unit 14 does not cause the user terminal 4 to display the privilege information. Next, the system control unit 14 proceeds to step S12.

On the other hand, if the system control unit 14 determines that the privilege flag is ON (step S3: YES), the system control unit 14 determines whether or not the current stock quantity of the target sale item is greater than or equal to the privilege giving stock quantity of the target sale item (step S5). At this time, if the system control unit 14 determines that the stock quantity is smaller than the privilege giving stock quantity (step S5: NO), the system control unit 14 proceeds to step S4.

On the other hand, if the system control unit 14 determines that the stock quantity is greater than or equal to the privilege giving stock quantity (step S5: YES), the system control unit 14 calculates the number of times when the privilege was given to the operation user in the set period (step S6). Specifically, the system control unit 14 searches the purchase history DB 12g for purchase histories in which the purchase date and time is included in a period from a predetermined number of days ago (may be a predetermined number of hours ago or a predetermined number of months ago) to the current time. Next, the system control unit 14 determines whether or not the privilege giving flag included in each found purchase history is set to ON. Then, the system control unit 14 counts the number of purchase histories in which the privilege giving flag is set to ON as the number of times when the privilege was given.

Next, the system control unit 14 determines whether or not the number of times when the privilege was given is smaller than a set number of times stored in the storage unit 12 (step S7). At this time, if the system control unit 14 determines that the number of times when the privilege is given is greater than or equal to the set number of times (step S7: NO), the system control unit 14 proceeds to step S4. On the other hand, if the system control unit 14 determines that the number of times when the privilege is given is smaller than the set number of times (step S7: YES), the system control unit 14 calculates the applied discount rate (step S8). For example, the system control unit 14 calculates the following formula:

Applied discount rate=discount rate of target sale item×(the set number of times−the number of times when the privilege was given)÷the set number of times The system control unit 14 may perform calculation so that the greater the number of times when the privilege is given, the lower the applied discount rate.

Next, the system control unit 14 generates a new displayed privilege ID. Next, the system control unit 14 acquires the current date and time as the displayed date and time. Then, the system control unit 14 registers the displayed privilege information including the displayed privilege ID, the displayed date and time, the user ID of the operation user, the shop ID and the sale item ID of the target sale item, and the applied discount rate in the displayed privilege information DB 12e (step S9).

Next, the system control unit 14 generates privilege information based on the applied discount rate (step S10). Specifically, the system control unit 14 generates the privilege information indicating that the purchase price of the item for sale is discounted by the discount rate indicated by the applied discount rate. Next, the system control unit 14 transmits the favorites registration completion display instruction including the privilege information and the displayed privilege ID to the user terminal 4 that is the transmitter of the request (step S11). By this process, as a presentation means, the system control unit 14 causes the user terminal 4 to display the privilege information. Next, the system control unit 14 proceeds to step S12.

In step S12, the system control unit 14 registers an operation history. Specifically, the system control unit 14 acquires a URL from the received request. Further, the system control unit 14 acquires the current date and time as an operation date and time. Then, the system control unit 14 registers an operation history including the user ID of the operation user, the operation date and time, and the URL in the operation history DB 12d. After completing the process of step S12, the system control unit 14 ends the request reception process.

The user terminal 4 that receives the favorites registration completion display instruction from the online shopping mall server 1 causes the favorites registration completion display area 130 to be displayed on the screen. When the privilege information is included in the favorites registration completion display instruction, as shown in FIG. 4A, the user terminal 4 displays the privilege information 131 and the shopping cart registration button 132 in the favorites registration completion display area 130.

In step S1, if the system control unit 14 determines that the operation to select the favorites button is not performed (step S1: NO), as shown in FIG. 8, the system control unit 14 determines whether or not an operation to select the shopping cart registration button is performed (step S21). At this time, if the system control unit 14 determines that the operation to select the shopping cart registration button is performed (step S21: Yes), the system control unit 14 determines whether or not the shopping cart registration button 132 is selected from between the shopping cart registration buttons 110 and 132 (step S22). When the user selects the shopping cart registration button 132, the user terminal 4 acquires the displayed privilege ID from the favorites registration completion display instruction received when the user terminal 4 displayed the favorites registration completion display area 130. Then, the user terminal 4 transmits a request in which a URL including the displayed privilege ID is set. On the other hand, when the user selects the shopping cart registration button 110, the user terminal 4 transmits a request in which a URL not including the displayed privilege ID is set. Therefore, the system control unit 14 can determine whether or not the selected shopping cart registration button is the shopping cart registration button 132 by determining whether or not the displayed privilege ID is included in the URL set in the request.

When the system control unit 14 determines that the user selects the shopping cart registration button 110 (step S22: NO), the system control unit 14 registers the shopping cart information (step S23). In the case of the operation to select the shopping cart registration button, the item for sale that is registered in the shopping cart is the target sale item. When the user selects the shopping cart registration button, the user terminal 4 transmits a request in which a URL including the sale item ID and the shop ID of the item for sale corresponding to the sale item page displayed on the screen is set. Then, the system control unit 14 acquires the sale item ID and the shop ID of the target sale item from the request. Further, the system control unit 14 sets the privilege application flag to OFF. In other words, the system control unit 14 applies no privilege to the item for sale registered in the shopping cart. Then, the system control unit 14 registers the shopping cart information including the user ID of the operation user, the sale item ID and the shop ID of the target sale item, and the privilege application flag in the shopping cart information DB 12f. After completing this process, the system control unit 14 proceeds to step S27.

On the other hand, when the system control unit 14 determines that the user selects the shopping cart registration button 132 (step S22: YES), the system control unit 14 acquires the displayed privilege ID from the received request. Then, the system control unit 14 acquires the displayed privilege information including the displayed privilege ID from the displayed privilege information DB 12e (step S24). Next, the system control unit 14 registers the shopping cart information (step S25). Specifically, the system control unit 14 acquires the applied discount rate from the displayed privilege information. Further, the system control unit 14 sets the privilege application flag to ON. In other words, the system control unit 14 applies the privilege to the item for sale registered in the shopping cart. Then, the system control unit 14 registers the shopping cart information including the user ID of the operation user, the sale item ID and the shop ID of the target sale item, the privilege application flag, and the applied discount rate in the shopping cart information DB 12f.

Next, the system control unit 14 deletes the acquired displayed privilege information from the displayed privilege information DB 12e (step S26). After completing this process, the system control unit 14 proceeds to step S27.

In step S27, the system control unit 14 transmits an HTML document of a shopping cart page to the user terminal 4 that is the transmitter of the request. Specifically, the system control unit 14 searches the shopping cart information DB 12f for the shopping cart information including the user ID of the operation user. Next, the system control unit 14 generates the HTML document of the shopping cart page based on the found shopping cart information. Then, the system control unit 14 transmits the generated HTML document. After completing this process, the system control unit 14 proceeds to step S12.

In step S21, if the system control unit 14 determines that the operation to select the shopping cart registration button is not performed (step S21: NO), as shown in FIG. 9, the system control unit 14 determines whether or not an operation to select the order confirmation button is performed (step S41). At this time, if the system control unit 14 determines that the operation to select the order confirmation button is not performed (step S41: NO), the system control unit 14 performs a process according to the operation content (step S42). Next, the system control unit 14 proceeds to step S12.

On the other hand, if the system control unit 14 determines that the operation to select the order confirmation button is performed (step S41: YES), the system control unit 14 selects one piece of the shopping cart information of the items for sale to be purchased (step S43). The system control unit 14 have already identified the shopping cart information of the items for sale to be purchased on the basis of the URL set in the request transmitted from the user terminal 4 when the user selects the purchase procedure button in the shopping cart page. Here, the item for sale corresponding to the selected shopping cart information is referred to as a "selected sale item".

Next, the system control unit 14 determines whether or not the privilege application flag included in the selected shopping cart information is ON (step S44). At this time, if the system control unit 14 determines that the privilege application flag is ON (step S44: YES), the system control unit 14 sets the privilege giving flag to ON (step S45). In other words, the system control unit 14 gives the privilege for the selected sale item. Next, the system control unit 14 calculates the purchase price (step S46). Specifically, the system control unit 14 acquires the sale item information including the sale item ID and the shop ID of the selected sale item from the sale item information DB 12b. Next, the system control unit 14 acquires the sale item price from the sale item information. Further, the system control unit 14 acquires the number of registered pieces and the applied discount rate from the selected shopping cart information. Next, the system control unit 14 calculates the following formula:

Purchase price=sale item price×(1−applied discount rate)×the number of registered pieces After calculating the purchase price, the system control unit 14 proceeds to step S49.

On the other hand, if the system control unit 14 determines that the privilege application flag is OFF (step S44: NO), the system control unit 14 sets the privilege giving flag to OFF (step S47). In other words, the system control unit 14 gives no privilege for the selected sale item. Next, the system control unit 14 calculates the purchase price by calculating the following formula (step S48).

Purchase price=sale item price×the number of registered pieces

After calculating the purchase price, the system control unit 14 proceeds to step S49.

In step S49, the system control unit 14 determines whether or not there are one or more pieces of the shopping cart information that have not yet been selected among pieces of the shopping cart information of the items for sale to be purchased. At this time, if the system control unit 14 determines that there are one or more pieces of the shopping cart information that have not yet been selected (step S49: YES), the system control unit 14 selects one of the pieces of the shopping cart information that have not yet been selected (step S50). Next, the system control unit 14 proceeds to step S44. The system control unit 14 calculates the purchase price for all the items for sale to be purchased by repeating the processes of steps S44 to S50. If the system control unit 14 determines that all the pieces of the shopping cart information have been selected (step S49: NO), the system control unit 14 registers a purchase history (step S51). Specifically, the system control unit 14 acquires the current date and time as the purchase date and time. Next, the system control unit 14 registers the purchase history including the purchase date and time, the user ID of the operation user, and the shop ID, the sale item ID, the purchase price, the privilege giving flag, the applied discount rate, and the like of the item for sale to be purchased in the purchase history DB 12g. After completing this process, the system control unit 14 proceeds to step S12.

If it is set so that the privilege is given if the purchase procedure is completed within a predetermined period of time from when the privilege information is displayed, the system control unit 14 need not perform the determination in step S22 in FIG. 8. This is because the system control unit 14 need not determine whether or not the privilege is applied at this time point. In this case, the system control unit 14 may register the shopping cart information in step S23. The privilege application flag and the applied discount rate need not be set in the shopping cart information. Then, the system control unit 14 searches for the displayed privilege information by the user ID, the shop ID, and the sale item ID included in the shopping cart information selected in FIG. 9. At this time, when the system control unit 14 finds the displayed privilege information, the system control unit 14 determines whether or not the displayed date and time included in the displayed privilege information is within a preset time period from the current time. At this time, if the displayed date and time is within the preset time period from the current time, the system control unit 14 performs processing so that the privilege is given (steps S45 and S46). On the other hand, when the system control unit 14 does not find the displayed privilege information or if the displayed date and time is not within the preset time period from the current time, the system control unit 14 performs processing so that no privilege is given (steps S47 and S48).

As described above, according to the present embodiment, the system control unit 14 detects the privilege giving target operation which is predetermined as an operation where the purchase motivation for the item for sale of the operation target is higher than that of the operation to display the sale item page and which is not an operation necessary to purchase the item for sale, and when the privilege giving target operation is detected, the system control unit 14 causes the privilege information related to the privilege to be given to the user to be presented on condition that the user purchases the item for sale that is a target of the privilege giving target operation. Therefore, it is possible to more increase the probability that the user purchases the item for sale than when the privilege information is presented when the purchase motivation of the user is at a level where the user is merely interested in the item for sale.

When the amount of privileges given to the user in a preset time period is greater than or equal to a set amount, the system control unit 14 does not cause the privilege information to be presented. Therefore, it is possible to prevent the user from performing the privilege giving target operation in order to acquire the privilege. Further, originally unnecessary operations are prevented from being performed, so that it is possible to prevent the processing load of the online shopping mall server 1 from increasing.

The system control unit 14 causes the privilege information including the value of privilege based on the amount of privileges given to the user in a preset time period to be presented and the system control unit 14 sets the value of privilege so that the greater the amount of given privileges, the smaller the value of privilege. Therefore, it is possible to prevent the user from performing the privilege giving target operation in order to acquire the privilege. Further, originally unnecessary operations are prevented from being performed, so that it is possible to prevent the processing load of the online shopping mall server 1 from increasing.

The system control unit 14 detects an operation to register an item for sale in the Favorites that holds a reference to the sale item page of the registered item for sale and when the operation is detected, the system control unit 14 causes the privilege information to be presented. Therefore, it is possible to appropriately identify a time when the purchase motivation of the user exceeds the level where the user is merely interested in the item for sale.

When the stock quantity of the item for sale that is a target of the privilege giving target operation is smaller than a set stock quantity, the system control unit 14 does not cause the privilege information to be presented. Therefore, even when an item for sale for which a privilege need not be given is made a target of the privilege giving target operation, it is possible to cause the privilege information not to be presented.

2. Second Embodiment

Next, an overview of a second embodiment will be described. In the second embodiment, the online shopping mall server 1 detects an operation to display a favorites bookmark page as an example of the privilege giving target operation. In the second and subsequent embodiments, description of the same points as those in the first embodiment will be omitted.

For example, when a user intends to check the items for sale registered in the Favorites or intends to study an item for sale to be purchased from among the items for sale registered in the Favorites, the user causes the favorites bookmark page to be displayed. It can be said that the purchase motivation of the user at this time is higher than the purchase motivation at the level where the user is merely interested in the item for sale. When a plurality of items for sale are registered in the Favorites, at the time point when the favorites bookmark page is displayed, the user may not be in a state in which the user is in particular interested in a specific item for sale among the plurality of items for sale. However, it is expected that the purchase motivation is higher for each of the plurality of items for sale registered in the Favorites. Therefore, when the privilege information of each item for sale registered in the Favorites is displayed at the timing when the favorites bookmark page is displayed, it is possible to promote the purchase of the items for sale.

Figure 10:
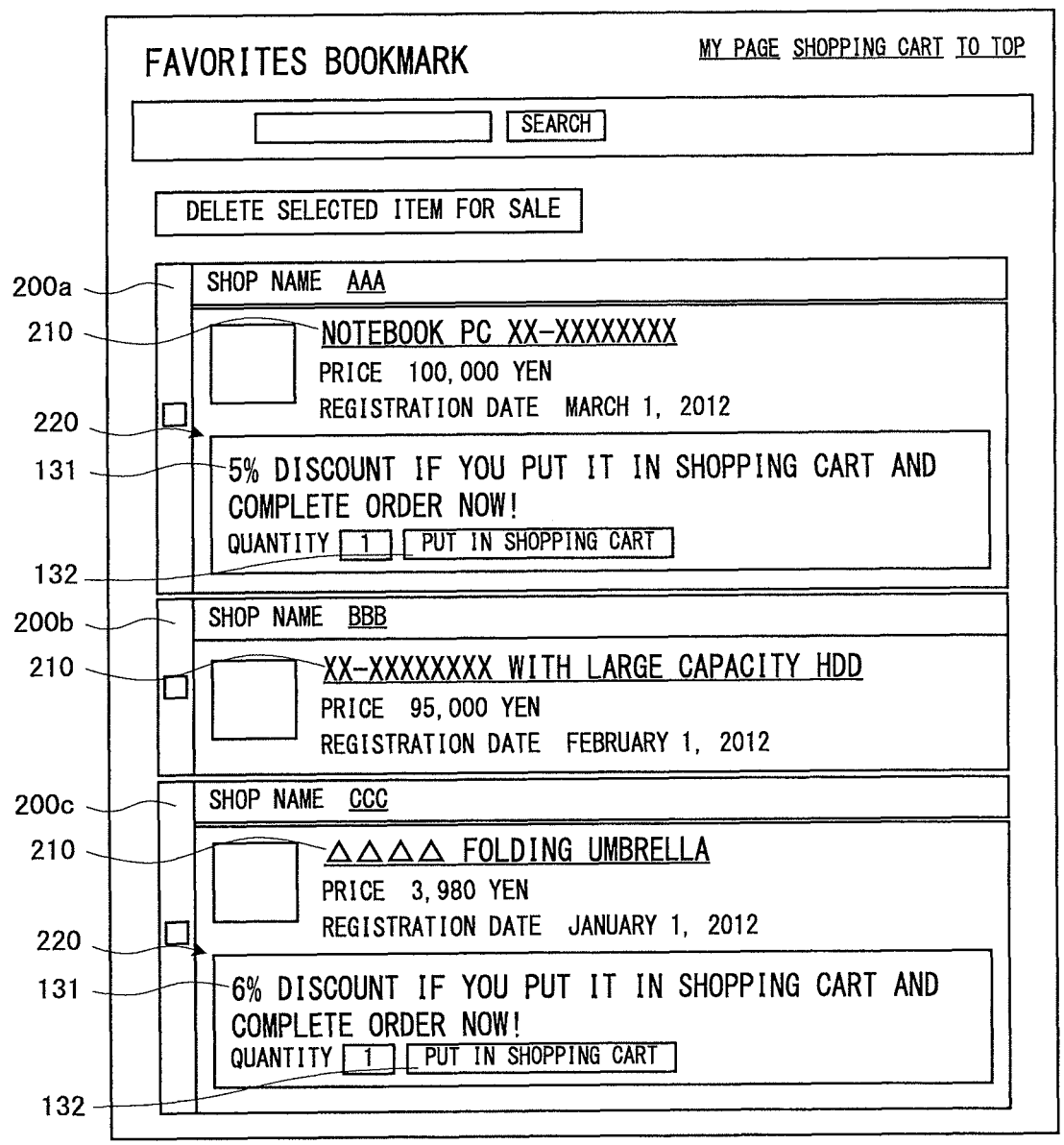
FIG. 10 is a diagram showing a display example of a favorites bookmark page.

FIG. 10 is a diagram showing a display example of the favorites bookmark page. In FIG. 10, the same elements as those in FIG. 3 are denoted by the same reference numerals. As shown in FIG. 10, in the favorites bookmark page, sale item information areas 200 (200a-200c) are displayed. The sale item information area 200 is displayed for each item for sale registered in the Favorites. In sale item information area 200, a sale item name link 210, an image of the item for sale, a sale item price, a date of registration to the Favorites, a shop name of the seller, and the like are displayed. The sale item name link 210 is a link indicating the sale item name of the item for sale registered in the Favorites. The sale item name link 210 is a link to the sale item page of the item for sale corresponding to the sale item name. The user can cause the sale item page to be displayed by selecting the sale item name link 210.

A privilege display area 220 is displayed in the sale item information area 200 of an item for sale that is a target of a privilege among the items for sale registered in the Favorites. In the privilege display area 220, privilege information 131 and a shopping cart registration button 132 are displayed. When the user purchases an item for sale by selecting the shopping cart registration button 132, the user can acquire the privilege indicated by the privilege information 131.

By the way, the user may register the same item for sale sold from a plurality of shops in the Favorites for each shop on purpose other than to acquire the privilege. For example, this is a case in which the user studies the item for sale to be purchased by comparing information displayed in the sale item page of each item for sale. Therefore, when the user purchases an item for sale that is a target of a privilege, the online shopping mall server 1 may increase the value of the privilege so that the user has no more disadvantages than when the user purchases an item for sale that is not a target of a privilege. Thereby, it is possible to promote purchase of an item for sale that is a target of a privilege among a plurality of the same items for sale.

In FIG. 10, the sale item information area 200a is a sale item information area 200 of a sale item X sold by a shop AAA. The sale item information area 200b is a sale item information area 200 of the sale item X sold by a shop BBB. The sale item X of the shop AAA is a target of a privilege and the sale item X of the shop BBB is not a target of a privilege. The price of the sale item X of the shop AAA is 100,000 yen and the price of the sale item X of the shop BBB is 95,000 yen. Here, the maximum value of the discount rate of the sale item X of the shop AAA is 10%. However, it is assumed that the applied discount rate is decreased to 3% because, for example, the amount of privileges given to the user in the past is large. Therefore, if the user purchases the sale item X from the shop AAA, the purchase price is 97,000 yen. Then, the sale item X of the shop AAA is more disadvantageous for the user than the sale item X of the shop BBB in terms of price. If the user considers the purchase by using the price as one of the criteria, there is a high probability that the user purchases the sale item X from the shop BBB instead of the shop AAA. Therefore, the online shopping mall server 1 sets the applied discount rate of the sale item X of the shop AAA to, for example, 5%. Then, the sale item X of the shop AAA is not disadvantageous compared with the sale item X of the shop BBB. FIG. 10 is a display example when the applied discount rate is 5%. If the online shopping mall server 1 sets the applied discount rate of the sale item X of the shop AAA to a value higher than 5%, the sale item X of the shop AAA becomes more advantageous than the sale item X of the shop BBB. Therefore, the probability that the user purchases the sale item X from the shop AAA increases. When the applied discount rate is raised, if the applied discount rate exceeds the maximum value of the applied discount rate, the online shopping mall server 1 need not raise the applied discount rate or may raise the discount rate to the maximum value.

Next, an operation of the information processing system S will be described with reference to FIGS. 11 to 13. The operation example described below is an operation example of a case in which the applied discount rate is determined so that the purchase price of an item for sale that is a target of a privilege is the same as the purchase price of an item for sale that is not a target of a privilege.

Figure 11:
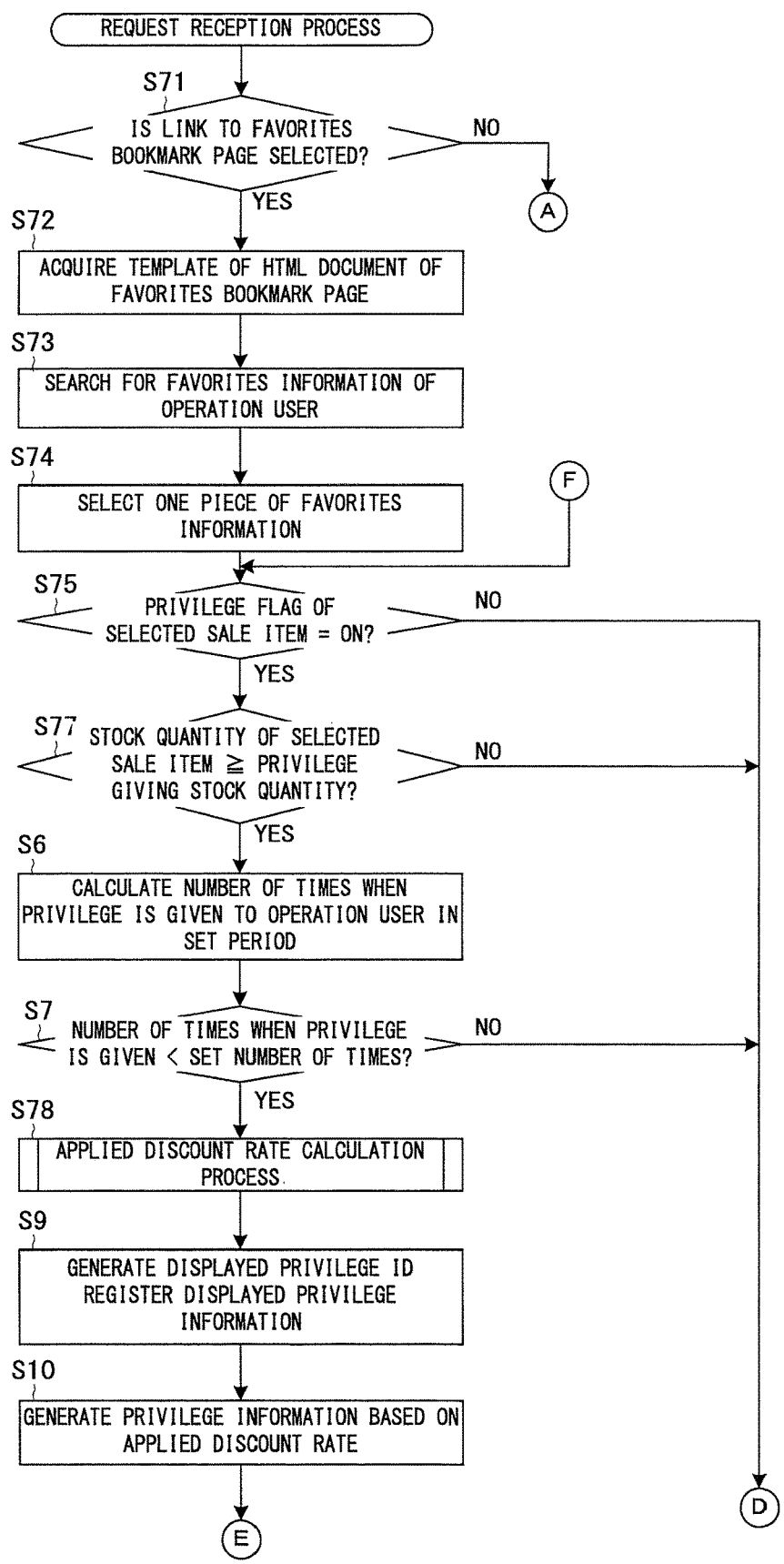
FIG. 11 is a flowchart showing a process example of a request reception process of a system control unit 14 of an online shopping mall server 1 according to an embodiment.
Figure 12:
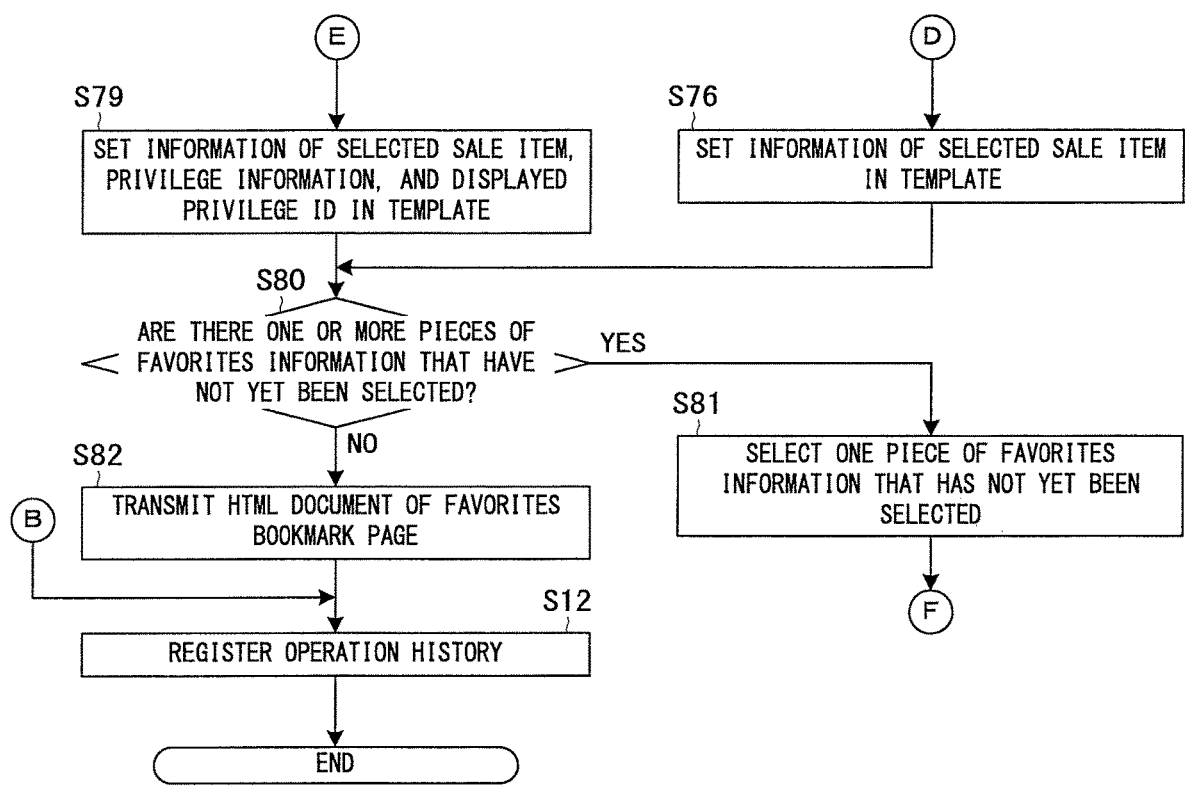
FIG. 12 is a flowchart showing a process example of the request reception process of the system control unit 14 of the online shopping mall server 1 according to the embodiment.

FIGS. 11 and 12 are a flowchart showing a process example of a request reception process of the system control unit 14 of the online shopping mall server 1 according to the present embodiment. In FIGS. 11 and 12, the same processes as those in FIG. 7 are denoted by the same reference numerals. In the second and subsequent embodiments, the process in the case in which the operation to select the shopping cart registration button is performed and the process in the case in which the operation to select the order confirmation button is performed are the same as those shown in FIGS. 8 and 9.

As shown in FIG. 11, the system control unit 14 determines whether or not an operation to select the link to the favorites bookmark page is performed on the basis of the URL set in the received request (step S71). At this time, if the system control unit 14 determines that the operation to select the link to the favorites bookmark page is not performed (step S71: NO), the system control unit 14 proceeds to step S21. On the other hand, as a detection means, if the system control unit 14 determines that the operation to select the link to the favorites bookmark page is performed (step S71: Yes), the system control unit 14 acquires a template of an HTML document of the favorites bookmark page from the storage unit 12 (step S72).

Next, the system control unit 14 searches the favorites information DB 12c for the favorites information including the user ID of the operation user (step S73). Next, the system control unit 14 acquires the shop ID and the sale item ID from each of found pieces of the favorites information. Then, the system control unit 14 acquires the sale item information including the acquired shop ID and sale item ID from the sale item information DB 12b.

Next, the system control unit 14 selects one of the found pieces of the favorites information (step S74). Here, the item for sale corresponding to the selected piece of the favorites information is referred to as a "selected sale item". When the link to the favorites bookmark page is selected, each item for sale registered in the Favorites is the target sale item. Next, the system control unit 14 determines whether or not the privilege flag of the selected sale item included in the sale item information of the selected sale item is ON (step S75). At this time, if the system control unit 14 determines that the privilege flag is OFF (step S75: NO), as shown in FIG. 12, the system control unit 14 sets information for displaying the sale item information area 200 of the selected sale item in a template (step S76). For example, the system control unit 14 sets the sale item name of the selected sale item, the URL of the sale item image, the URL of the sale item page, the sale item price, and the like in the template. At this time, the system control unit 14 performs setting so that the privilege display area 220 is not displayed. After completing this process, the system control unit 14 proceeds to step S80.

On the other hand, if the system control unit 14 determines that the privilege flag is ON (step S75: YES), as shown in FIG. 11, the system control unit 14 determines whether or not the current stock quantity of the selected sale item is greater than or equal to the privilege giving stock quantity of the selected sale item (step S77). At this time, if the system control unit 14 determines that the stock quantity is smaller than the privilege giving stock quantity (step S77: NO), the system control unit 14 proceeds to step S76. On the other hand, if the system control unit 14 determines that the stock quantity is greater than or equal to the privilege giving stock quantity (step S77: YES), the system control unit 14 performs steps S6 and S7. In step S7, if the system control unit 14 determines that the number of times when the privilege is given is greater than or equal to the set number of times (step S7: NO), the system control unit 14 proceeds to step S76. On the other hand, if the system control unit 14 determines that the number of times when the privilege is given is smaller than the set number of times (step S7: YES), the system control unit 14 performs an applied discount rate calculation process (step S78).

Figure 13:
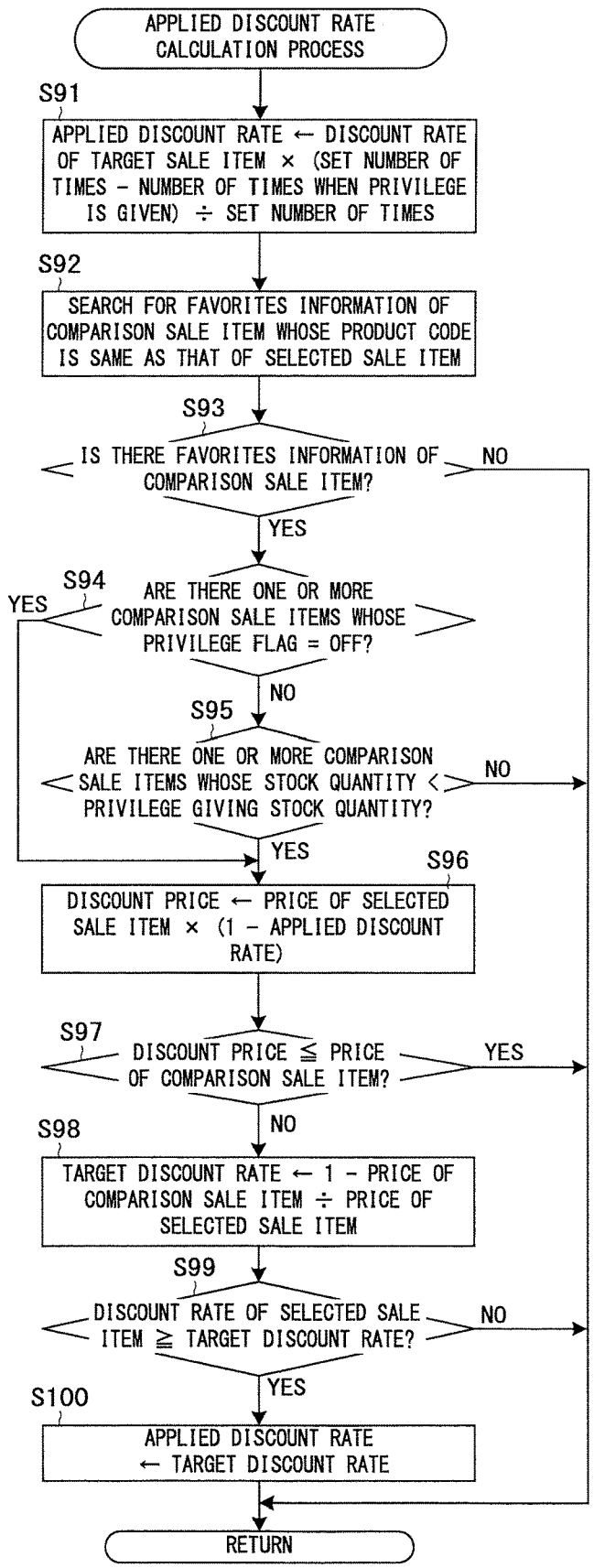
FIG. 13 is a flowchart showing a process example of an applied discount rate calculation process of the system control unit 14 of the online shopping mall server 1 according to the embodiment.

FIG. 13 is a flowchart showing a process example of the applied discount rate calculation process of the system control unit 14 of the online shopping mall server 1 according to the present embodiment.

As shown in FIG. 13, the system control unit 14 calculates the applied discount rate of the selected sale item (step S91) in the same manner as in step S8 shown in FIG. 7. Next, the system control unit 14 searches for the favorites information of an item for sale whose product code is the same as that of the selected sale item among the items for sale registered in the Favorites of the operation user (step S92). The item for sale whose product code is the same as that of the selected sale item is referred to as a "comparison sale item". The system control unit 14 determines whether or not each item for sale is the comparison sale item on the basis of the product code included in the sale item information of each item for sale registered in the Favorites. Next, the system control unit 14 determines whether or not the favorites information of the comparison sale item is found (step S93). At this time, if the system control unit 14 determines that the favorites information of the comparison sale item is not found (step S93: NO), the system control unit 14 ends the applied discount rate calculation process. There is no item for sale whose product code is the same as that of the selected sale item, it is not necessary to raise the value of the privilege of the selected sale item.

On the other hand, if the system control unit 14 determines that the favorites information of the comparison sale item is found (step S93: YES), the system control unit 14 determines whether or not there are one or more comparison sale items whose privilege flag is OFF (step S94). At this time, if the system control unit 14 determines that there are one or more comparison sale items whose privilege flag is OFF (step S94: YES), the system control unit 14 proceeds to step S96. On the other hand, if the system control unit 14 determines that there is no comparison sale item whose privilege flag is OFF (step S94: NO), the system control unit 14 determines whether or not there are one or more comparison sale items whose current stock quantity is smaller than the privilege giving stock quantity (step S95). At this time, if the system control unit 14 determines that there is no comparison sale item whose stock quantity is smaller than the privilege giving stock quantity (step S95: NO), the system control unit 14 ends the applied discount rate calculation process. The privilege is applied to all the items for sale whose product code is the same as that of the selected sale item, so that it is not necessary to raise the value of the privilege of the selected sale item. On the other hand, if the system control unit 14 determines that there are one or more comparison sale items whose stock quantity is smaller than the privilege giving stock quantity (step S95: YES), the system control unit 14 proceeds to step S96.

In step S96, the system control unit 14 calculates the discount price of the selected sale item (step S96). Specifically, the system control unit 14 calculates the following formula:

Discount price=price of selected sale item×(1−applied discount rate of selected sale item)

Next, the system control unit 14 acquires the price of the comparison sale item whose price is the lowest among the comparison sale items to which no privilege is applied. The comparison sale items to which no privilege is applied are comparison sale items whose privilege flag is OFF and comparison sale items whose privilege flag is ON and whose stock quantity is smaller than the privilege giving stock quantity. Next, the system control unit 14 determines whether or not the discount price of the selected sale item is lower than or equal to the acquired price of the comparison sale item (step S97). At this time, if the system control unit 14 determines that the discount price of the selected sale item is lower than or equal to the price of the comparison sale item (step S97: YES), the system control unit 14 ends the applied discount rate calculation process.

On the other hand, if the system control unit 14 determines that the discount price of the selected sale item is higher than the price of the comparison sale item (step S97: NO), the system control unit 14 calculates a target discount rate (step S98). Specifically, the system control unit 14 calculates the following formula:

Target discount rate=1−price of comparison sale item÷price of selected sale item before discount Next, the system control unit 14 determines whether or not the discount rate included in the sale item information of the selected sale item is greater than or equal to the target discount rate (step S99). At this time, if the system control unit 14 determines that the discount rate is smaller than the target discount rate (step S99: NO), the system control unit 14 ends the applied discount rate calculation process. On the other hand, if the system control unit 14 determines that the discount rate is greater than or equal to the target discount rate (step S99: YES), the system control unit 14 changes the applied discount rate to the calculated target discount rate (step S100). Then, the system control unit 14 ends the applied discount rate calculation process.

After completing the applied discount rate calculation process, the system control unit 14 performs steps S9 and S10 as shown in FIG. 11. Next, as shown in FIG. 12, the system control unit 14 sets information to display the sale item information area 200 and the privilege display area 220 of the selected sale item in the template (step S79). Specifically, the system control unit 14 sets the sale item name of the selected sale item, the URL of the sale item image, the URL of the sale item page, the sale item price, and the like in the template. Further, the system control unit 14 sets the privilege information and the displayed privilege ID in the template and sets information to display the shopping cart registration button in the template. After completing this process, the system control unit 14 proceeds to step S80.

In step S80, the system control unit 14 determines whether or not there are one or more pieces of the favorites information that have not yet been selected among pieces of the favorites information found in step S73. At this time, if the system control unit 14 determines that there are one or more pieces of the favorites information that have not yet been selected (step S80: YES), the system control unit 14 selects one piece of the favorites information that has not yet been selected (step S81). Next, the system control unit 14 proceeds to step S75. The system control unit 14 performs setting to display the sale item information area 200 of each item for sale registered in the Favorites by repeating the processes of steps S75 to S81. If the system control unit 14 determines that all the pieces of the favorites information have been selected (step S80: NO), as a presentation means, the system control unit 14 transmits the HTML document of the favorites bookmark page completed by setting information to the user terminal 4 that is the transmitter of the request (step S82). Next, the system control unit 14 proceeds to step S12. The user terminal 4 that receives the HTML document displays, for example, the favorites bookmark page as shown in FIG. 10.

As described above, according to the present embodiment, the system control unit 14 detects an operation to display the favorites bookmark page, and when the operation is detected, the system control unit 14 causes the privilege information to be presented. Therefore, it is possible to appropriately identify a time when the purchase motivation of the user exceeds the level where the user is merely interested in the item for sale.

3. Third Embodiment

Next, an overview of a third embodiment will be described. In the third embodiment, the online shopping mall server 1 detects an operation to display a sale item page of an item for sale registered in the Favorites as an example of the privilege giving target operation.

When a user browses a sale item page of an item for sale that is not registered in the Favorites and, for example, the user becomes more interested in the item for sale, the user registers the item for sale in the Favorites. It is assumed that thereafter, the user browses the sale item page of the item for sale that is registered in the Favorites. In this case, there is a probability that, for example, the user is further more interested in the item for sale than ever before or the user seriously intends to consider whether or not to purchase the item for sale. It can be said that the purchase motivation at this time is higher than the purchase motivation at the level where the user is merely interested in the item for sale. Therefore, it can be considered that the purchase motivation of the user at the time when the user performs an operation to display the sale item page of the item for sale registered in the Favorites is higher than the purchase motivation at the time when the user performs an operation to display a sale item page of an item for sale that is not registered in the Favorites. Both of these operations are operations to cause a sale item page to be displayed. However, states of the registration to the Favorites of the items for sale whose sale item page is displayed are different from each other. In other words, even when the user performs an operation to display a sale item page, the purchase motivation of the user varies depending on the state of the registration to the Favorites. Therefore, at the timing when the operation to display the sale item page of the item for sale registered in the Favorites is performed, if the privilege information of the item for sale whose sale item page is displayed is displayed, it is possible to promote the purchase of the item for sale.

Figure 14:
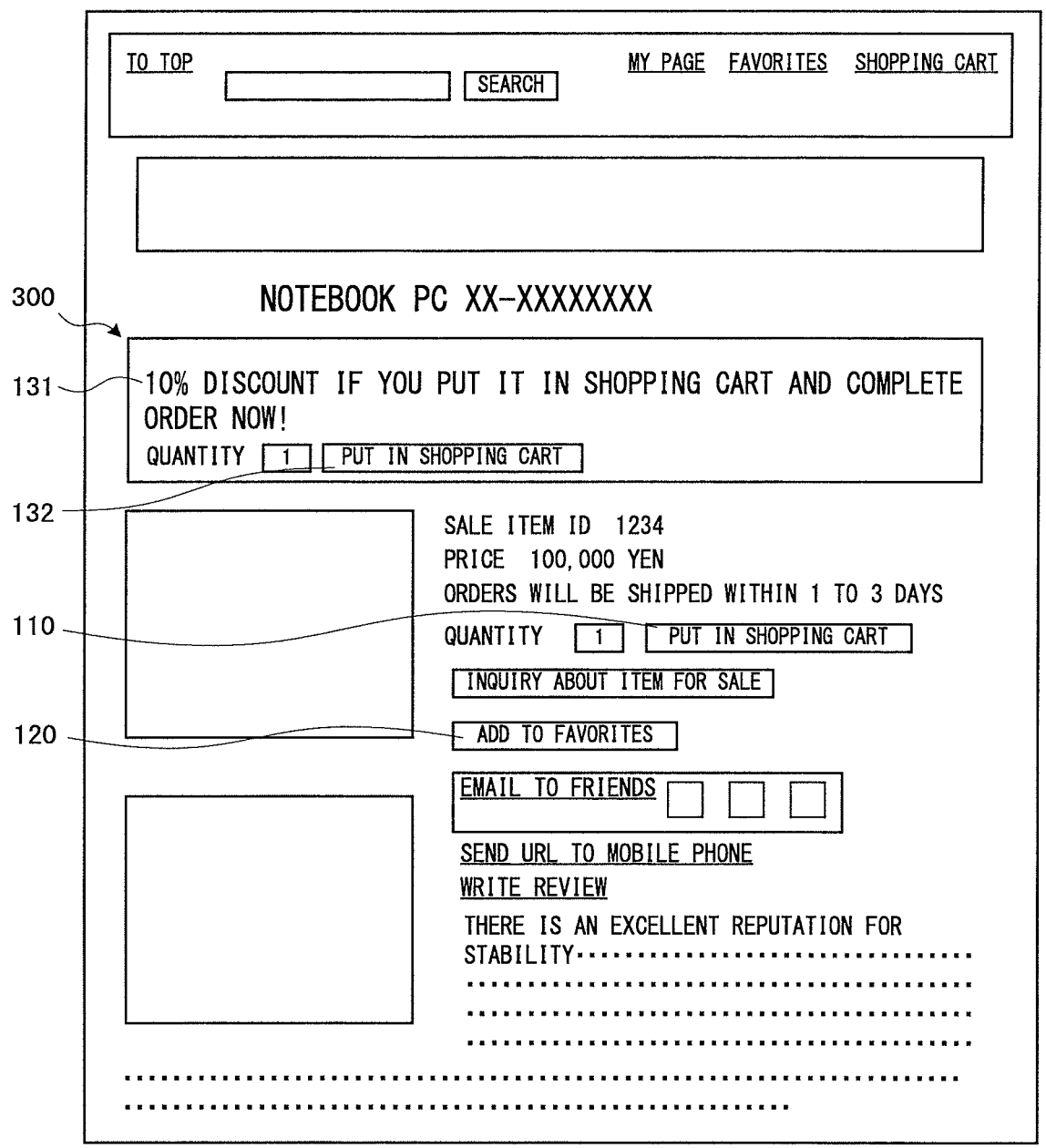
FIG. 14 is a diagram showing a display example of privilege information in a sale item page.

FIG. 14 is a diagram showing a display example of the privilege information in the sale item page. In FIG. 14, the same elements as those in FIG. 3 are denoted by the same reference numerals. When the user performs an operation to display a sale item page of an item for sale that is not registered in the Favorites, the sale item page as shown in FIG. 3 is displayed. At this time, no privilege information is displayed. When the user performs an operation to display a sale item page of an item for sale which is registered in the Favorites and which is not a target of a privilege, the sale item page as shown in FIG. 3 is displayed. On the other hand, when the user performs an operation to display a sale item page of an item for sale which is registered in the Favorites and which is a target of a privilege, the sale item page as shown in FIG. 14 is displayed. At this time, a privilege display area 300 is displayed in the sale item page. In the privilege display area 300, the privilege information 131 and the shopping cart registration button 132 are displayed. When the user purchases the item for sale by selecting the shopping cart registration button 132, the user can acquire the privilege indicated by the privilege information 131.

Examples of the operation to display the sale item page include an operation to select the sale item name link 210 in the favorites bookmark page shown in FIG. 10, an operation to select a link to a sale item page of a found item for sale in the search result page, and an operation to select a link to a sale item page, in a web page in the online shopping mall or a web page of a site other than the online shopping mall. The online shopping mall server 1 performs control so as to cause the privilege display area 300 to be displayed in the sale item page when detecting any operation that causes the sale item page to be displayed. The online shopping mall server 1 may cause the privilege display area 300 to be displayed only when detecting a specific operation among operations that causes the sale item page to be displayed. For example, the online shopping mall server 1 may cause the privilege display area 300 to be displayed only when an operation to select the sale item name link 210 is performed in the favorites bookmark page. This is because, in the case of this operation, the probability that the motivation to purchase the item for sale registered in the Favorites is higher than that in the case of other operations.

Next, the operation of the information processing system S will be described with reference to FIG. 15.

Figure 15:
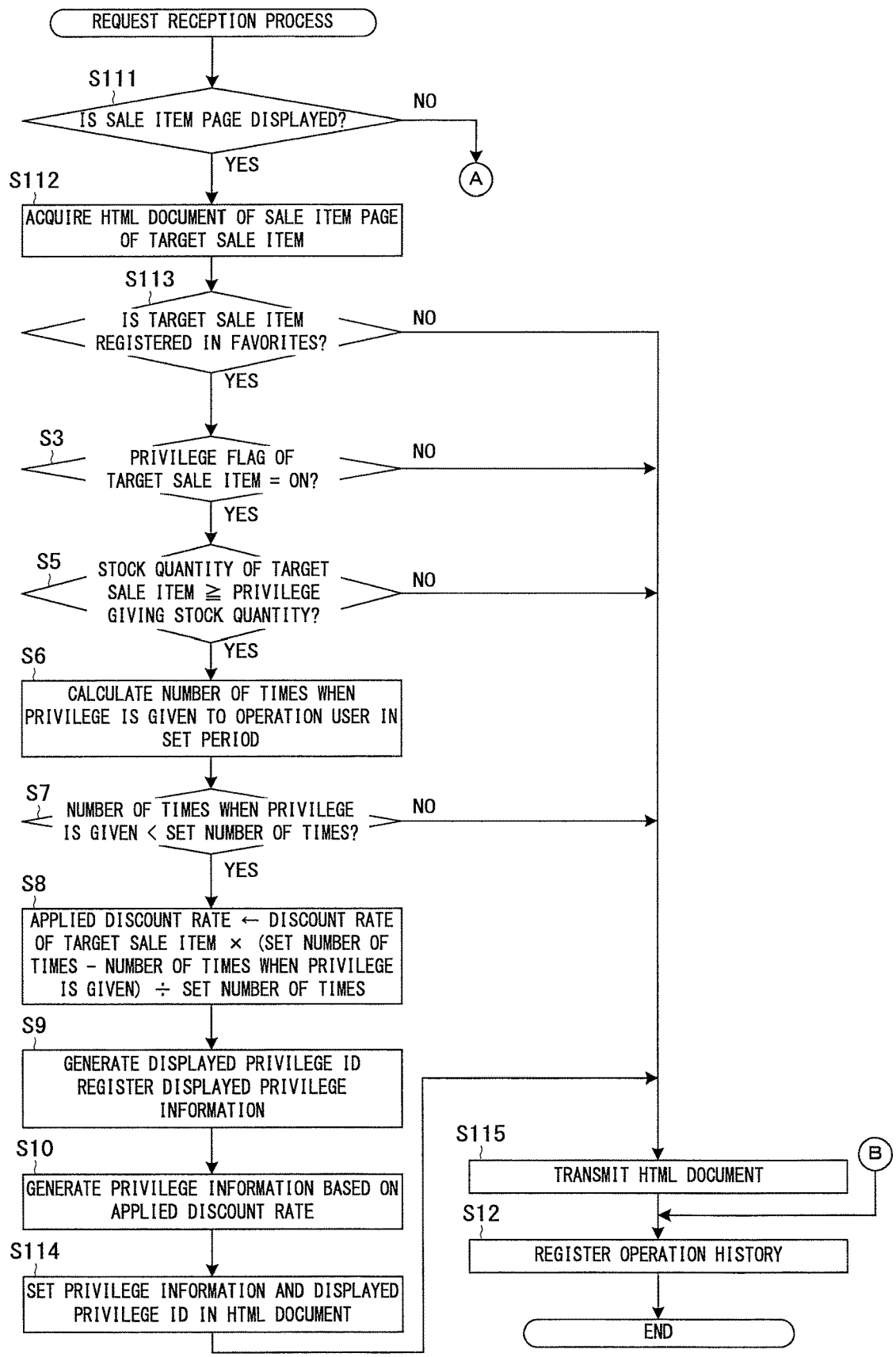
FIG. 15 is a flowchart showing a process example of a request reception process of a system control unit 14 of an online shopping mall server 1 according to an embodiment.

FIG. 15 is a flowchart showing a process example of a request reception process of the system control unit 14 of the online shopping mall server 1 according to the present embodiment. In FIG. 15, the same processes as those in FIG. 7 are denoted by the same reference numerals.

As shown in FIG. 15, the system control unit 14 determines whether or not an operation to display a sale item page is performed on the basis of the URL set in the received request (step S111). At this time, if the system control unit 14 determines that the operation to display a sale item page is not performed (step S111: NO), the system control unit 14 proceeds to step S21. On the other hand, if the system control unit 14 determines that the operation to display a sale item page is performed (step S111: YES), the system control unit 14 acquires an HTML document of the sale item page of the target sale item from the storage unit 12 (step S112). In the case of the operation to display a sale item page, the item for sale whose sale item page is displayed is the target sale item. The URL set in the request transmitted from the user terminal 4 when the user performs an operation to display a sale item page is the URL of the sale item page of the target sale item. Therefore, the system control unit 14 acquires an HTML document corresponding to the URL set in the received request.

Next, the system control unit 14 determines whether or not the target sale item is registered in the Favorites (step S113). Specifically, the system control unit 14 searches the favorites information DB 12*c* for favorites information including the user ID of the operation user and the shop ID and the sale item ID of the target sale item. The shop ID and the sale item ID of the target sale item are included in the URL of the sale item page. When the system control unit 14 cannot find corresponding favorites information, the system control unit 14 determines that the target sale item is not registered in the Favorites (step S113: NO). In this case, the system control unit 14 transmits the HTML document acquired from the storage unit 12 to the user terminal 4 that is the transmitter of the request without change (step S115). Next, the system control unit 14 proceeds to step S12.

On the other hand, when the system control unit 14 can find corresponding favorites information, the system control unit 14 determines that the target sale item is registered in the Favorites (step S113: YES). In this case, the system control unit 14 performs steps S3 and S5 to S10. When the system control unit 14 determines that the privilege flag is OFF in step S3 (step S3: NO), or when the system control unit 14 determines that the stock quantity is smaller than the privilege giving stock quantity in step S5 (step S5: NO), or when the system control unit 14 determines that the number of times when the privilege is given is greater than or equal to the set number of times in step S7 (step S7: NO), the system control unit 14 proceeds to step S115. After completing the process of step S10, the system control unit 14 sets information to display the privilege display area 300 in the HTML document acquired from the storage unit 12 (step S114). Specifically, the system control unit 14 sets the privilege information and the displayed privilege ID in the HTML document and sets information to display the shopping cart registration button in the HTML document. After completing this process, as a presentation means, the system control unit 14 transmits the HTML document where the setting is performed to the user terminal 4 that is the transmitter of the request (step S115).

As described above, according to the present embodiment, the system control unit 14 detects the operation to display the sale item page of the item for sale registered in the Favorites as a privilege display target operation where the purchase motivation is higher than that of the operation to display a sale item page of an item for sale that is not registered in the Favorites, and when the privilege display target operation is detected, the system control unit 14 causes the privilege information to be displayed. Therefore, it is possible to appropriately identify a time when the purchase motivation of the user exceeds the level where the user is merely interested in the item for sale.

4. Fourth Embodiment

Next, an overview of a fourth embodiment will be described. The fourth embodiment is different from the first embodiment in that a user is prevented from registering an item for sale in the Favorites in order to acquire a privilege.

It is assumed that each of a plurality of shops sells the same item for sale. For example, each of shops Z1, Z2, and Z3 sells a sale item Y. The user registers the sale item Y of the shop Z1, the sale item Y of the shop Z2, and the sale item Y of the shop Z3 in the Favorites one after another in order to purchase an item for sale whose value of privilege is high. Every time the user performs a registration operation to the Favorites, the privilege information is displayed. However, in this case, displaying the privilege information does not cause the effect of increasing the purchase motivation of the user. Therefore, when the online shopping mall server 1 detects an operation to register an item for sale in the Favorites, the online shopping mall server 1 controls giving the privilege and displaying the privilege information on the basis of the number of items for sale having been registered in the Favorites, which are the same as the item for sale to be registered by the detected operation and which are sold by shops different from a shop that sells the item for sale to be registered by the detected operation. The number of items for sale having been registered in the Favorites is referred to as the "number of existing registrations".

Specifically, when the number of existing registrations is greater than or equal to a set number of registrations that is preset, the online shopping mall server 1 may give no privilege and may display no privilege information. For example, it is assumed that the set number of registrations is 2. In this case, when the user registers the sale item Y of the shop Z1, the privilege information is displayed, and thereafter, when the user registers the sale item Y of the shop Z2, the privilege information is also displayed. Thereafter, when the user registers the sale item Y of the shop Z3, the privilege information is not displayed. The online shopping mall server 1 may set the privilege so that the greater the number of existing registrations, the lower the value of the privilege to be given, and may display the privilege information according to the value of the privilege. When the number of existing registrations is smaller than the set number of registrations, the online shopping mall server 1 may set the value of the privilege to a constant value, and when the number of existing registrations is greater than or equal to the set number of registrations, the online shopping mall server 1 may set the privilege so that the greater the number of existing registrations, the lower the value of the privilege to be given. Alternatively, when the number of existing registrations is greater than or equal to the set number of registrations, the online shopping mall server 1 gives no privilege, and when the number of existing registrations is smaller than the set number of registrations, the online shopping mall server 1 may set the privilege so that the greater the number of existing registrations, the lower the value of the privilege to be given.

Next, the operation of the information processing system S will be described with reference to FIG. 16. The operation example described below is an operation example of a case in which the number of existing registrations is used for both determining whether or not to give the privilege and deciding the value of the privilege.

Figure 16:
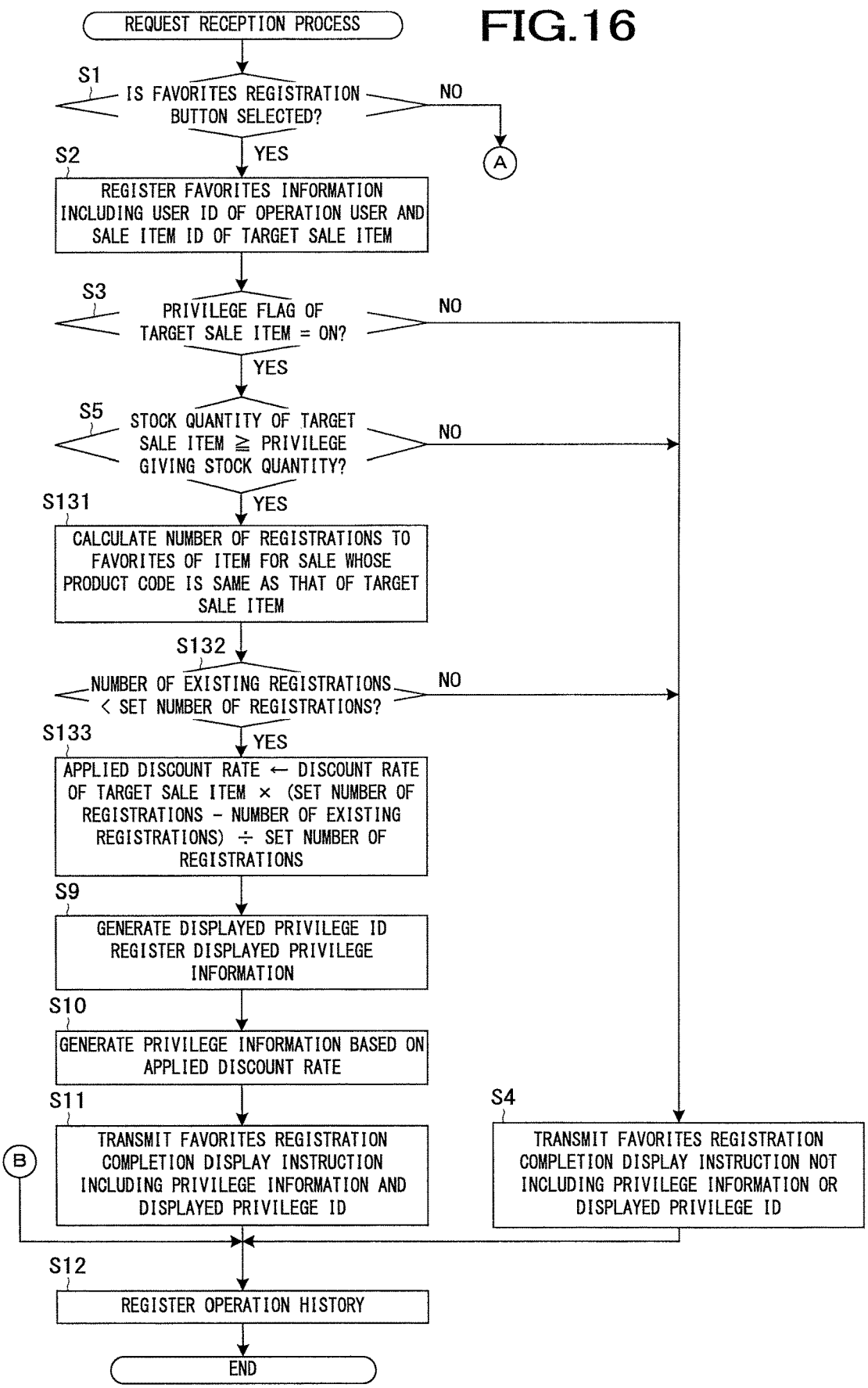
FIG. 16 is a flowchart showing a process example of a request reception process of a system control unit 14 of an online shopping mall server 1 according to an embodiment.

FIG. 16 is a flowchart showing a process example of a request reception process of the system control unit 14 of the online shopping mall server 1 according to the present embodiment. In FIG. 16, the same processes as those in FIG. 7 are denoted by the same reference numerals.

As shown in FIG. 16, the system control unit 14 performs steps S1 to S3 and S5. In step S5, if the system control unit 14 determines that the stock quantity is greater than or equal to the privilege giving stock quantity (step S5: YES), the system control unit 14 calculates the number of existing registrations to the Favorites of an item for sale whose product code is the same as that of the target sale item (step S131). Specifically, the system control unit 14 acquires the product code from the sale item information of the target sale item. Next, the system control unit 14 searches the favorites information DB 12c for the favorites information including the user ID of the operation user. Next, the system control unit 14 acquires the shop ID and the sale item ID from each of found pieces of the favorites information. Next, the system control unit 14 acquires the sale item information including the acquired shop ID and sale item ID from the sale item information DB 12b. Next, the system control unit 14 compares the product code included in the acquired sale item information with the product code of the target sale item. Then, the system control unit 14 counts the number of items for sale whose product code is the same as that of the target sale item as the number of existing registrations. The favorites information of the target sale item has already been registered in step S2, so that the system control unit 14 performs the count so that the number of the target sale item is not included in the number of existing registrations.

After counting the number of existing registrations, the system control unit 14 determines whether or not the number of existing registrations is smaller than the set number of registrations stored in the storage unit 12 (step S132). At this time, if the system control unit 14 determines that the number of existing registrations is greater than or equal to the set number of registrations (step S132: NO), the system control unit 14 proceeds to step S4. On the other hand, if the system control unit 14 determines that the number of existing registrations is smaller than the set number of registrations (step S132: YES), the system control unit 14 calculates the applied discount rate (step S133). For example, the system control unit 14 calculates the following formula:

Applied discount rate=discount rate of target sale item×(the set number of registrations−the number of existing registrations)÷the set number of registrations The system control unit 14 may perform calculation so that the greater the number of existing registrations, the lower the applied discount rate. After completing the process of step S133, the system control unit 14 performs steps S9 to S12.

As described above, according to the present embodiment, the system control unit 14 causes no privilege information to be presented when the number of items for sale registered in the Favorites which are the same as the item for sale targeted by the privilege display target operation and which are sold by shops different from a shop that sells the item for sale targeted by the privilege display target operation is greater than or equal to the set number of registrations. Therefore, it is possible to prevent the user from performing the privilege display target operation related to the Favorites in order to acquire the privilege. Further, originally unnecessary operations are prevented from being performed, so that it is possible to prevent the processing load of the online shopping mall server 1 from increasing.

Further, the system control unit 14 causes privilege information including the value of the privilege based on the number of existing registrations to the Favorites of an item for sale, which is the same as the item for sale targeted by the privilege display target operation and which is sold by a shop different from a shop that sells the item for sale targeted by the privilege display target operation, to be presented, and sets the value of the privilege so that the greater the number of existing registrations, the lower the value of the privilege. Therefore, it is possible to prevent the user from performing the privilege display target operation related to the Favorites in order to acquire the privilege. Further, originally unnecessary operations are prevented from being performed, so that it is possible to prevent the processing load of the online shopping mall server 1 from increasing.

Also in the second embodiment and the third embodiment, it is possible to control the giving of the privilege and the displaying of the privilege information based on the number of existing registrations to the Favorites which are sold by shops different from a shop that sells the item for sale targeted by the privilege display target operation.

5. Fifth Embodiment

Next, an overview of a fifth embodiment will be described. In the fifth embodiment, the online shopping mall server 1 controls the giving of the privilege and the displaying of the privilege information based on a conversion ratio from the Favorites.

The conversion ratio from the Favorites is a ratio of purchased items for sale to the items for sale registered in the Favorites. When the conversion ratio is high, the items for sale registered in the Favorites sell well, the necessity of displaying the privilege information is low. On the other hand, when the conversion ratio is low, the items for sale registered in the Favorites do not sell well, the necessity of displaying the privilege information is high. Therefore, when the conversion ratio is greater than or equal to a set conversion ratio that is preset, the online shopping mall server 1 may give no privilege and may display no privilege information. The online shopping mall server 1 may set the privilege so that the greater the conversion ratio, the lower the value of the privilege to be given, and may display the privilege information according to the value of the privilege. When the conversion ratio is smaller than the set conversion ratio, the online shopping mall server 1 may set the value of the privilege to a constant value, and when the conversion ratio is greater than or equal to the set conversion ratio, the online shopping mall server 1 may set the privilege so that the higher the conversion ratio, the lower the value of the privilege to be given. When the conversion ratio is greater than or equal to the set conversion ratio, the online shopping mall server 1 may give no privilege, and when the conversion ratio is smaller than the set conversion ratio, the online shopping mall server 1 may set the privilege so that the higher the conversion ratio, the lower the value of the privilege to be given.

The conversion ratio from the Favorites may be a conversion ratio in the entire online shopping mall. The conversion ratio from the Favorites may be a conversion ratio only for shops that are sellers of the items for sale registered in the Favorites, a conversion ratio only for the items for sale registered in the Favorites, or a conversion ratio only for the user who performed the operation to register items for sale in the Favorites.

Next, the operation of the information processing system S will be described with reference to FIG. 17. The operation example described below is an operation example of a case in which the conversion ratio is used for both determining whether or not to give the privilege and deciding the value of the privilege. Further, the operation example described below is an operation example of a case in which the conversion ratio in the entire online shopping mall is used.

Figure 17:
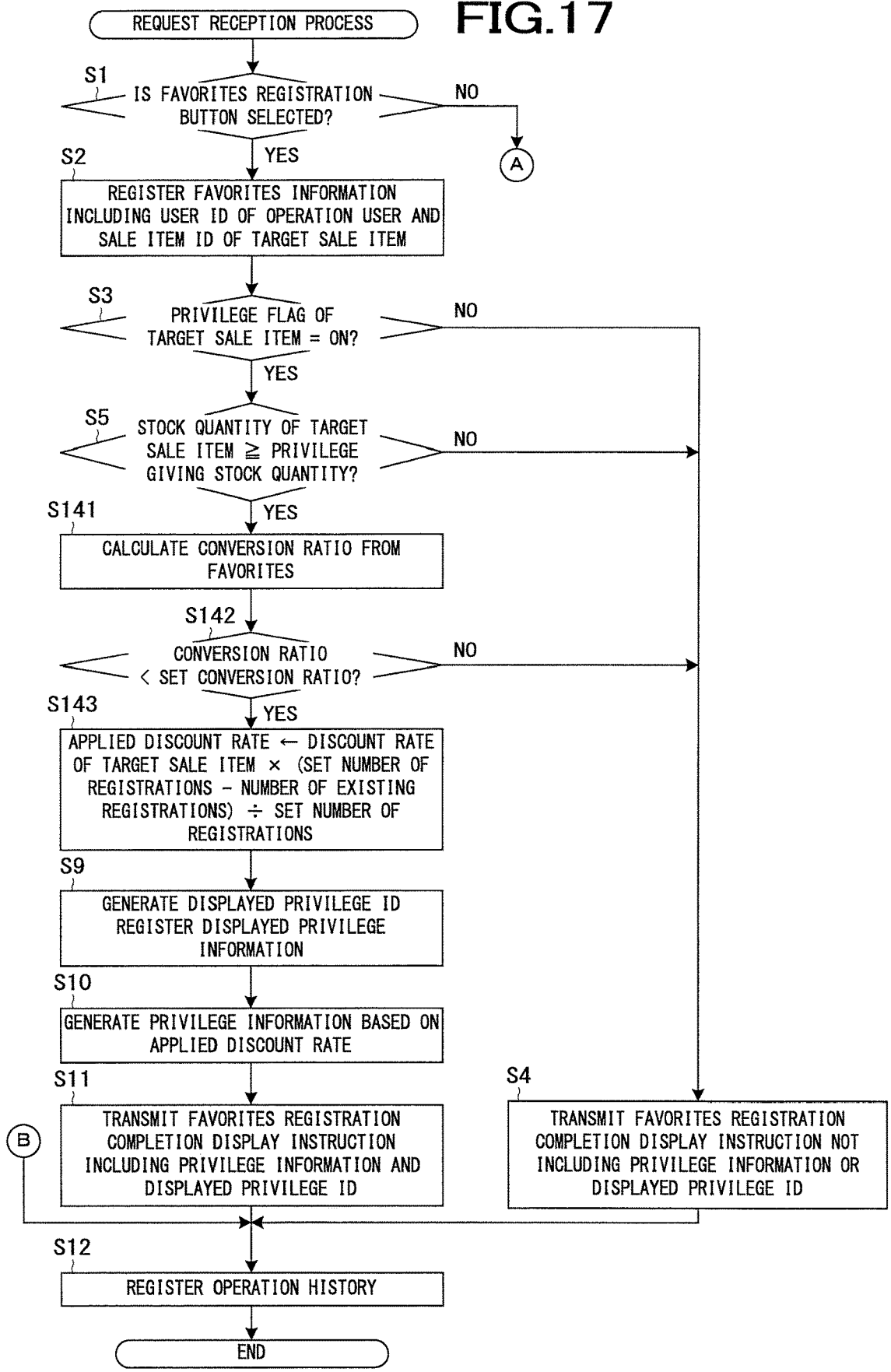
FIG. 17 is a flowchart showing a process example of a request reception process of a system control unit 14 of an online shopping mall server 1 according to an embodiment.

FIG. 17 is a flowchart showing a process example of a request reception process of the system control unit 14 of the online shopping mall server 1 according to the present embodiment. In FIG. 17, the same processes as those in FIG. 7 are denoted by the same reference numerals.

As shown in FIG. 17, the system control unit 14 performs steps S1 to S3 and S5. In step S5, if the system control unit 14 determines that the stock quantity is greater than or equal to the privilege giving stock quantity (step S5: YES), the system control unit 14 calculates the conversion ratio from the Favorites (step S141). Specifically, the system control unit 14 calculates the number of the items for sale registered in the Favorites in a predetermined period of time as the number of registrations and calculates the number of items for sale that are purchased from among the items for sale registered in the Favorites as the number of purchases. More specifically, the system control unit 14 searches the operation history DB 12d for operation histories of registering an item for sale in the Favorites from among operation histories in which the operation date and time is included in a period from a predetermined number of days ago (may be a predetermined number of hours ago or a predetermined number of months ago) to the current time. The system control unit 14 determines the type of operation on the basis of the URL included in the operation history. Next, the system control unit 14 defines the number of found operation histories as the number of registrations. Next, the system control unit 14 determines whether or not the items for sale registered in the Favorites are purchased after being registered in the Favorites. Specifically, the system control unit 14 acquires the user ID of the user who performed registration to the Favorites from the found operation history. Further, the system control unit 14 acquires the shop ID and the sale item ID of the item for sale registered in the Favorites from the URL included in the found operation history. Next, the system control unit 14 searches the purchase history DB 12g for the purchase history including the user ID, the shop ID, and the sale item ID acquired from the operation history. If no corresponding purchase history is found, the item for sale registered in the Favorites is not purchased. On the other hand, if a corresponding purchase history is found, the system control unit 14 determines whether or not the purchase is performed after the registration to the Favorites is performed on the basis of the operation date and time included in the operation history and the purchase date and time included in the purchase history. In this way, the system control unit 14 determines whether or not the purchase is performed after the registration to the Favorites is performed for each found operation history. Then, the system control unit 14 defines the number of items for sale that are purchased after being registered in the Favorites as the number of purchases. Next, the system control unit 14 calculates the conversion ratio by dividing the number of purchases by the number of registrations. The system control unit 14 need not include items for sale, which are deleted during the period from the Favorites from when the items for sale are registered in the Favorites to when the items for sale are purchased, in the conversion ratio. Whether or not an item for sale is deleted from the Favorites can be determined from the operation history.

After calculating the conversion ratio, the system control unit 14 determines whether or not the conversion ratio is smaller than the set conversion ratio stored in the storage unit 12 (step S142). At this time, if the system control unit 14 determines that the conversion ratio is greater than or equal to the set conversion ratio (step S142: NO), the system control unit 14 proceeds to step S4. On the other hand, if the system control unit 14 determines that the conversion ratio is smaller than the set conversion ratio (step S142: YES), the system control unit 14 calculates the applied discount rate (step S143).

For example, the system control unit 14 calculates the following formula:

Applied discount rate=discount rate of target sale item×(set conversion ratio−conversion ratio)÷set conversion ratio The system control unit 14 may perform calculation so that the greater the conversion ratio, the lower the applied discount rate. After completing the process of step S143, the system control unit 14 performs steps S9 to S12.

As described above, according to the present embodiment, the system control unit 14 causes the privilege information to be presented when the conversion ratio from the Favorites is smaller than the set conversion ratio. Therefore, when the conversion ratio from the Favorites is low, it is possible to raise the conversion ratio. Therefore, it is possible to prevent the number of purchases of the items for sale registered in the Favorites from decreasing.

Further, the system control unit 14 causes the privilege information including the value of privilege based on the conversion ratio from the Favorites to be presented and sets the value of privilege so that the lower the conversion ratio, the higher the value of privilege. Therefore, the lower the conversion ratio from the Favorites, the more the conversion ratio can be raised. Therefore, it is possible to prevent the number of purchases of the items for sale registered in the Favorites from decreasing.

Also in the second embodiment and the third embodiment, it is possible to control the giving of the privilege and the displaying of the privilege information based on the conversion ratio from the Favorites.

The online shopping mall server 1 may be configured so that a plurality of embodiments selected from among the first, the fourth, and the fifth embodiments are combined and implemented. In this case, the online shopping mall server 1 may determine the applied discount rate based on a plurality of pieces of information from among the given amount of privileges, the number of existing registrations of the same item for sale, and the conversion ratio.

6. Sixth Embodiment

Next, an overview of a sixth embodiment will be described. In the sixth embodiment, the online shopping mall server 1 detects an operation to delete an item for sale from the shopping cart as an example of the privilege giving target operation.

A user registers an item for sale which the user determines to purchase in the shopping cart. Thereafter, for example, the user plans to purchase the item for sale registered in the shopping cart later instead of purchasing the item for sale now. In this case, the user deletes the item for sale from the shopping cart. At this time, the purchase motivation of the user, which was once increased, is reduced. However, the user plans to purchase the item for sale later, so that it can be said that the purchase motivation at this time is higher than the purchase motivation at the level where the user is merely interested in the item for sale. Thereafter, as the time elapses after the user purchases the item for sale from the shopping cart, the purchase motivation of the user tends to decrease. Therefore, after the time elapses, the user may not purchase the item for sale which the user plans to purchase later. Therefore, by displaying the privilege information of the deleted item for sale at the timing when the item for sale is deleted from the shopping cart, it is possible to increase the purchase motivation of the user, which was once reduced. Thereby, it is possible to promote the purchase of the item for sale.

FIGS. 18A and 18B are diagrams showing a display example of the shopping cart page. In FIGS. 18A and 18B, the same components as those in FIG. 3 are denoted by the same reference numerals. As shown in FIG. 18A, in the shopping cart page, shopping cart areas 410 (410a and 410b) are displayed. The shopping cart area 410 is displayed for each shop that is the seller of the items for sale registered in the shopping cart. In the shopping cart area 410, a shop name, and a purchase procedure button 412 are displayed. Further, in the shopping cart area 410, information of the item for sale registered in the shopping cart is displayed for each item for sale. For example, the sale item name, the sale item price, the number of pieces put in the shopping cart, and the like are displayed. Further, in the shopping cart area 410, a delete button 411 is displayed for each item for sale registered in the shopping cart. The delete button 411 is a button to delete the item for sale from the shopping cart.

The user selects the delete button 411. Then, as shown in FIG. 18b, the shopping cart page is redisplayed. In FIG. 18B, information of the item for sale deleted from the shopping cart is deleted from the shopping cart page. Further, a privilege display area 420 is displayed in the shopping cart page. In the privilege display area 420, privilege information 131 and a shopping cart registration button 132 are displayed. As the privilege information 131, for example, "XX % discount if you put ○○○ in the shopping cart and complete the order now!" is displayed. "○○○" is a sale item name of the item for sale deleted from the shopping cart. When the user puts the item for sale in the shopping cart again by selecting the shopping cart registration button 132 and purchases the item for sale, the user can acquire the privilege indicated by the privilege information 131.

By the way, a user who knows that the user can acquire the privilege by deleting the item for sale from the shopping cart may delete the item for sale from the shopping cart in order to acquire the privilege. Specifically, the user puts the item for sale in the shopping cart, and thereafter, the user deletes the item for sale from the shopping cart and then puts the item for sale in the shopping cart again. Every time the user performs the operation to delete the item for sale from the shopping cart, the privilege information is displayed. However, in this case, displaying the privilege information does not cause the effect of increasing the purchase motivation of the user. Therefore, when the online shopping mall server 1 detects an operation to delete an item for sale from the shopping cart, the online shopping mall server 1 controls the giving of the privilege and the displaying of the privilege information based on the frequency of deletion of an item for sale from the shopping cart performed by a user who performed the operation. The frequency of deletion of an item for sale from the shopping cart is referred to as a "deletion frequency". Specifically, when the deletion frequency is greater than or equal to a set frequency that is preset, the online shopping mall server 1 may give no privilege and may display no privilege information. The online shopping mall server 1 may set the privilege so that the higher the deletion frequency, the lower the value of the privilege to be given, and may display the privilege information according to the value of the privilege. When the deletion frequency is lower than the set frequency, the online shopping mall server 1 may set the value of the privilege to a constant value, and when the deletion frequency is higher than or equal to the set frequency, the online shopping mall server 1 may set the privilege so that the higher the deletion frequency, the lower the value of the privilege to be given. When the deletion frequency is higher than or equal to the set frequency, the online shopping mall server 1 may give no privilege, and when the deletion frequency is lower than the set frequency, the online shopping mall server 1 may set the privilege so that the higher the deletion frequency, the lower the value of the privilege to be given.

Next, the operation of the information processing system S will be described with reference to FIG. 19. The operation example described below is an operation example in a case in which the deletion frequency from the shopping cart is used for both determining whether or not to give the privilege and deciding the value of the privilege.

Figure 19:
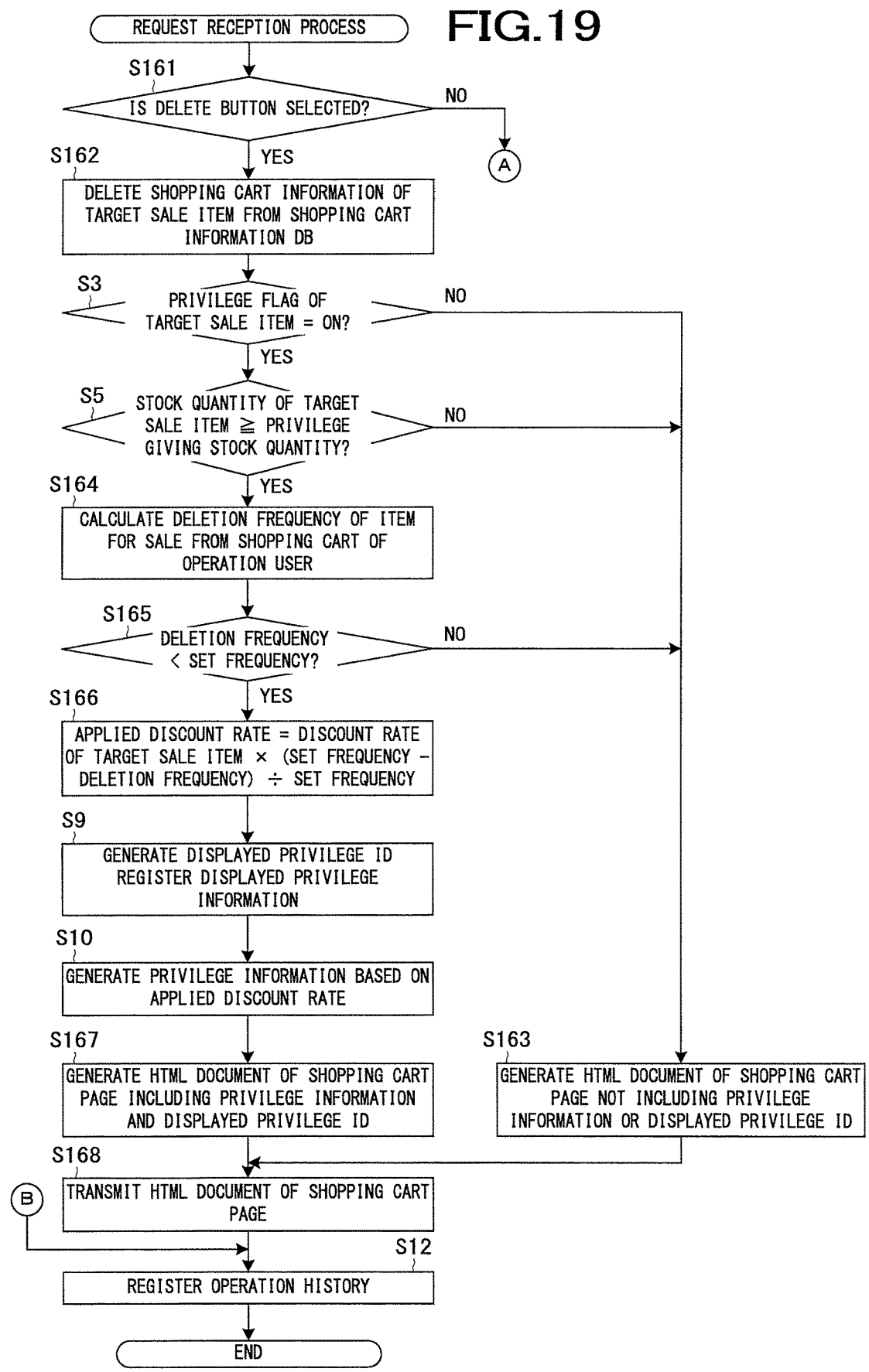
FIG. 19 is a flowchart showing a process example of a request reception process of a system control unit 14 of an online shopping mall server 1 according to an embodiment.

FIG. 19 is a flowchart showing a process example of a request reception process of the system control unit 14 of the online shopping mall server 1 according to the present embodiment. In FIG. 19, the same processes as those in FIG. 7 are denoted by the same reference numerals.

As shown in FIG. 19, the system control unit 14 determines whether or not an operation to select the delete button is performed from the shopping cart page on the basis of the URL set in the received request (step S161). At this time, if the system control unit 14 determines that the operation to select the delete button is not performed (step S161: NO), the system control unit 14 proceeds to step S21. On the other hand, as a detection means, if the system control unit 14 determines that the operation to select the delete button is performed (step S161: YES), the system control unit 14 deletes the shopping cart information of the target sale item from the shopping cart information DB 12$f$ (step S162). In the case of the operation to select the delete button, the item for sale that is a target of the deletion from the shopping cart is the target sale item. When the user selects the delete button, the user terminal 4 transmits a request in which a URL including the shop ID and the sale item ID of the target sale item corresponding to the selected delete button is set. Then, the system control unit 14 acquires the shop ID and the sale item ID from the received request. Next, the system control unit 14 searches the shopping cart information DB 12$f$ for the shopping cart information including the acquired shop ID and sale item ID. Then, the system control unit 14 deletes the found shopping cart information from the shopping cart information DB 12$f$.

Next, the system control unit 14 performs steps S3 and S5. When the system control unit 14 determines that the privilege flag is OFF in step S3 (step S3: NO) or when the system control unit 14 determines that the stock quantity is smaller than the privilege giving stock quantity in step S5 (step S5: NO), the system control unit 14 proceeds to step S163. In step S163, the system control unit 14 generates an HTML document of a shopping cart page. Specifically, the system control unit 14 searches the shopping cart information DB 12$f$ for the shopping cart information including the user ID of the operation user. Then, the system control unit 14 generates the HTML document of the shopping cart page to display the shopping cart area 410 on the basis of the found shopping cart information. At this time, the system control unit 14 generates the HTML document so that the privilege display area 420 is not displayed. After completing this process, the system control unit 14 proceeds to step S168.

In step S5, if the system control unit 14 determines that the stock quantity is greater than or equal to the privilege giving stock quantity (step S5: YES), the system control unit 14 calculates the deletion frequency of the operation user (step S164). Specifically, the system control unit 14 searches the operation history DB 12$d$ for operation histories which are operation histories including the user ID of the operation user and are operation histories of an operation to delete an item for sale from the shopping cart from among operation histories in which the operation date and time is included in a period from a predetermined number of days ago (may be a predetermined number of hours ago or a predetermined number of months ago) to the current time. Then, the system control unit 14 defines the number of found operation histories as the deletion frequency. Next, the system control unit 14 determines whether or not the deletion frequency is lower than the set frequency stored in the storage unit 12 (step S165). At this time, if the system control unit 14 determines that the deletion frequency is higher than or equal to the set frequency (step S165: NO), the system control unit 14 proceeds to step S163.

On the other hand, if the system control unit 14 determines that the deletion frequency is lower than the set frequency (step S165: YES), the system control unit 14 calculates the applied discount rate (step S166). For example, the system control unit 14 calculates the following formula:

Applied discount rate=discount rate of target sale item×(set frequency−deletion frequency)÷set frequency The system control unit 14 may perform calculation so that the higher the deletion frequency, the lower the applied discount rate.

Next, the system control unit 14 performs steps S9 and S10. Next, the system control unit 14 generates an HTML document of a shopping cart page so that the privilege display area 420 is displayed (step S167). Specifically, the system control unit 14 generates an HTML document including the privilege information, the displayed privilege ID, and information to display the shopping cart registration button. After completing this process, the system control unit 14 proceeds to step S168.

In step S168, as a presentation means, the system control unit 14 transmits the HTML document of the shopping cart page generated in step S163 or S167 to the user terminal 4 that is the transmitter of the request. Next, the system control unit 14 proceeds to step S12. The user terminal 4 that receives the HTML document displays, for example, the shopping cart page as shown in FIG. 18B when the item for sale deleted from the shopping cart is a target of a privilege.

As described above, according to the present embodiment, the system control unit 14 detects an operation to delete an item for sale from the shopping cart in which the item for sale selected by the user as a target which the user intends to purchase is registered, and when the operation is detected, the system control unit 14 causes the privilege information to be presented. Therefore, it is possible to appropriately identify a time when the purchase motivation of the user exceeds the level where the user is merely interested in the item for sale. Further, it is possible to prevent the user from not purchasing the item for sale due to further decreasing purchase motivation.

Further, when the frequency with which the user performs an operation to delete an item for sale from the shopping cart is higher than or equal to the set frequency, the system control unit 14 does not cause the privilege information to be presented. Therefore, it is possible to prevent the user from performing the operation to delete an item for sale from the shopping cart in order to acquire the privilege. Further, originally unnecessary operations are prevented from being performed, so that it is possible to prevent the processing load of the online shopping mall server 1 from increasing.

Further, the system control unit 14 causes the privilege information including the value of privilege based on the frequency with which the user performs an operation to delete an item for sale from the shopping cart to be presented and sets the value of privilege so that the higher the frequency, the lower the value of privilege. Therefore, it is possible to prevent the user from performing the operation to delete an item for sale from the shopping cart in order to acquire the privilege. Further, originally unnecessary operations are prevented from being performed, so that it is possible to prevent the processing load of the online shopping mall server 1 from increasing.

The online shopping mall server 1 may control the giving of the privilege and the displaying of the privilege information based on the amount of privileges given in the past in the same manner as in the first embodiment.

7. Seventh Embodiment

Next, an overview of a seventh embodiment will be described. In the seventh embodiment, the online shopping mall server 1 detects, as an example of the privilege giving target operation, an operation to send a request for searching for websites by using a name of an item for sale whose sale item page is displayed as a search condition to a web search site. The name of an item for sale is an example of identification information of the present invention.

Figure 20A:
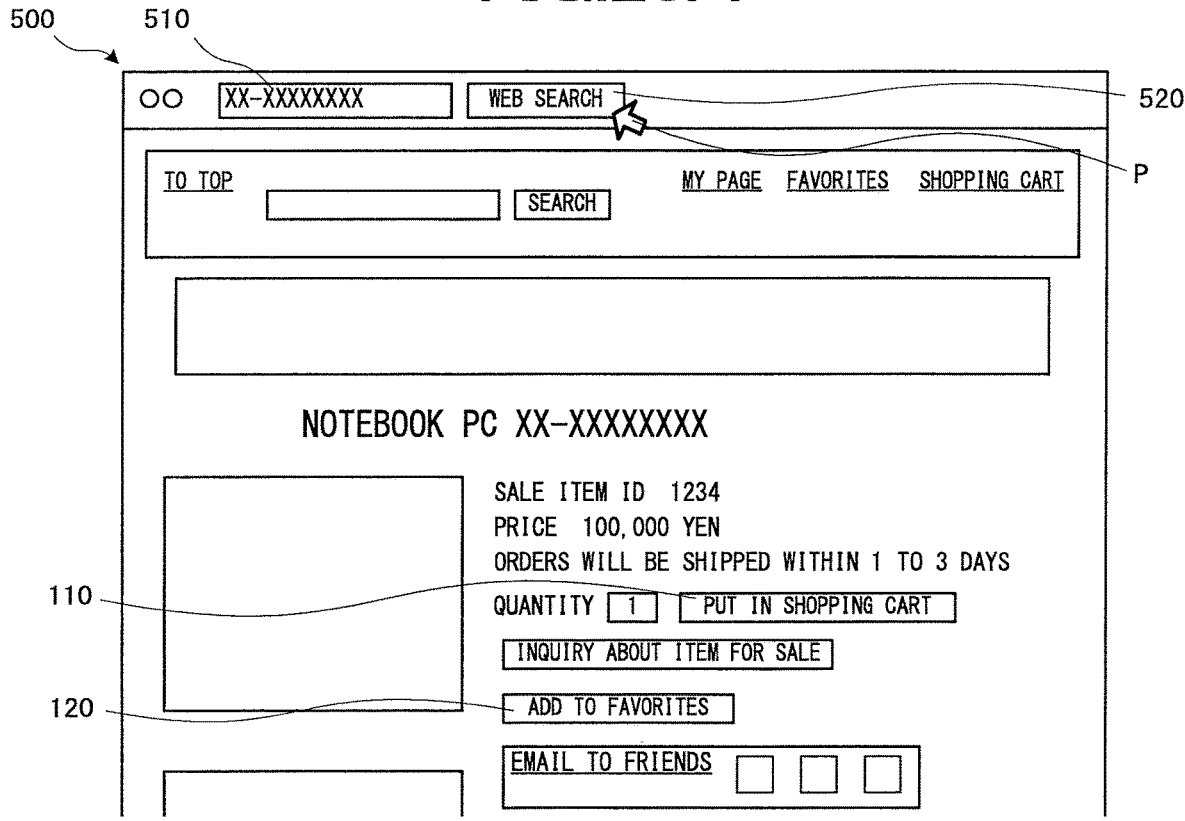
FIG. 20A is a display example of a toolbar.

A tool bar program for searching for web pages by using the web search site is provided from the web search site. The tool bar program is provided as an add-on to expand functions of a browser. FIG. 20A is a display example of the tool bar. When the tool bar program is installed in the browser, as illustrated in FIG. 20A, a tool bar 500 is displayed on the screen of the browser. In a client area of the browser, a sale item page of the online shopping mall is displayed. In the toolbar 500, a keyword input area 510 and a search button 520 are displayed. The keyword input area 510 is an input area for inputting a keyword as a search condition. The search button 520 is a button to request the web search server 2 to perform search. When a user inputs a keyword in the keyword input area 510 and selects the search button 520, the user terminal 4 transmits a search request including the inputted keyword to the web search server 2. The web search server 2 that receives the search request searches for web pages corresponding to the inputted keyword. Then, the web search server 2 transmits a web search result page in which a list of found web pages is displayed to the user terminal 4. Then, the user terminal 4 displays the web search result page. By the toolbar 500, even when the currently displayed web page is a web page of any site, the user can directly search for web pages by using the web search site.

After a user browses a sale item page of a certain item for sale in the online shopping mall, the user may want more information about the item for sale. At this time, if the tool bar 500 is displayed in the browser, the user can input a name of the item for sale in the keyword input area 510 and search for web pages in which information of the item for sale is posted. It can be considered that the user is more interested in the item for sale for which the user wants more information after browsing the sale item page than in items for sale in which the user is merely interested. In other words, the purchase motivation of the user at this time is higher than the purchase motivation at the level where the user is merely interested in the item for sale. Therefore, at the timing when an operation to request a search by specifying the name, as a search condition, of the item for sale whose sale item page is displayed is performed in the tool bar 500, if the privilege information of the item for sale corresponding to the inputted name is displayed, it is possible to promote the purchase of the item for sale. Regarding a purchase destination of the item for sale, the user may consider that there is a possibility that the user purchases the item for sale from a website other than the online shopping mall managed by the online shopping mall server 1. In this case, the user may search for other websites by inputting the name of the item for sale in order to compare the online shopping mall managed by the online shopping mall server 1 with other websites. Then, if information of another website from which the item for sale can be purchased is included in the web search result page, the user may purchase the item for sale from the website. However, if the privilege information is displayed, it is possible to increase the probability that the user purchases the item for sale from the online shopping mall managed by the online shopping mall server 1.

Figure 20B:
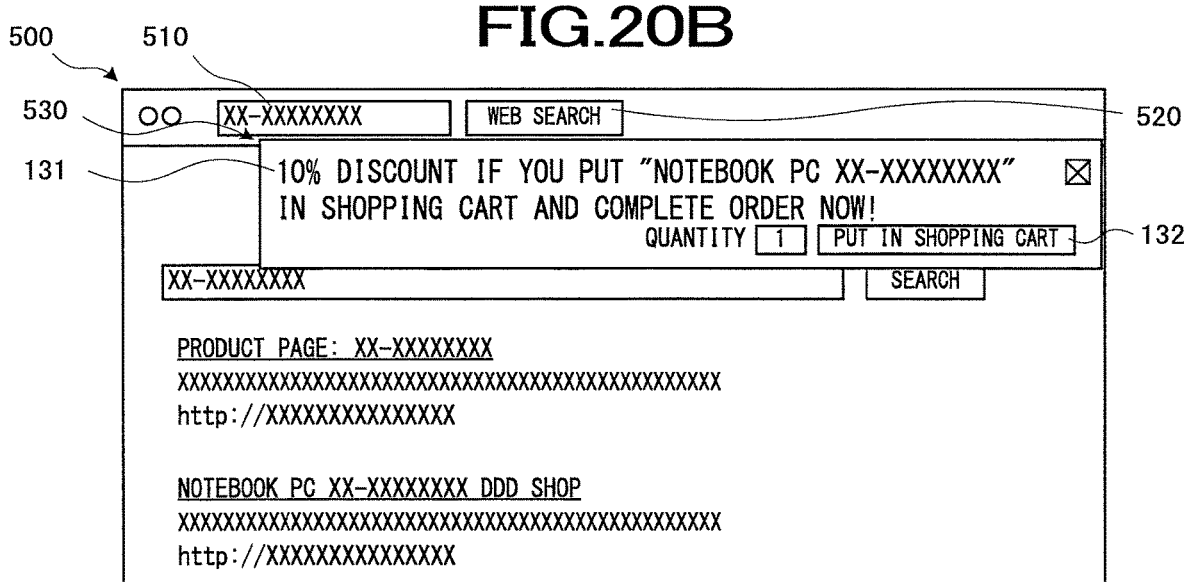
FIG. 20B is a display example of privilege information.

FIG. 20B is a display example of the privilege information corresponding to the tool bar. In FIG. 20B, the same elements as those in FIG. 3 are denoted by the same reference numerals. As shown in FIG. 20A, the sale item page of a sale item X whose sale item name is "Notebook PC XX-XXXXXXXX" is displayed. It is assumed that the official name of the sale item X is "XX-XXXXXXXX". Therefore, the user inputs "XX-XXXXXXXX" in the keyword input area 510 and selects the search button 520. Then, as shown in FIG. 20B, the web search result page is displayed on the screen of the browser. Further, a privilege display area 530 is displayed on the screen of the browser. In the privilege display area 530, privilege information 131 and a shopping cart registration button 132 are displayed. As the privilege information 131, for example, "XX % discount if you put Notebook PC XX-XXXXXXXX in the shopping cart and complete the order now!" is displayed. When the user purchases the item for sale by selecting the shopping cart registration button 132, the user can acquire the privilege indicated by the privilege information 131.

In order for the online shopping mall server 1 to cause the user terminal 4 to display the privilege display area 530, the online shopping mall server 1 needs to acquire the keyword inputted in the keyword input area 510. Therefore, the tool bar program is generated so that the user terminal 4 transmits the keyword inputted in the keyword input area 510 to the online shopping mall server 1. For example, the tool bar program may be configured so that the user terminal 4 transmits a search request to the web search server 2 and transmits a request including the keyword to the online shopping mall server 1. Alternatively, for example, the tool bar program may be configured so that the user terminal 4 transmits a search request to the online shopping mall server 1. Then, the online shopping mall server 1 may redirect the search request to the web search server 2.

By the way, as the time elapses after the user browsed information of an item for sale in a sale item page, the probability that the user loses interest in the item for sale whose information was browsed by the user increases. Further, the user may forget the fact itself that the user browsed the sale item page. In this state, even when the user performs an operation to request a search by using the name of the item for sale as a search condition, the purchase motivation of the user may not be higher than the level where the user is merely interested in the item for sale. Even if the privilege information is displayed at this time, the probability that the purchase motivation of the user does not increase to the level where the user determines to purchase the item for sale increases. Therefore, the online shopping mall server 1 may cause the privilege information to be displayed only when the inputted keyword includes the name of the item for sale whose sale item page is currently displayed.

Not only when a sale item page is currently displayed, but also when a web page of the online shopping mall is continuously displayed until now, the online shopping mall server may determine items for sale whose sale item page is displayed while the web page(s) of the online shopping mall is continuously displayed as candidates for an item for sale for which the privilege information is displayed. The state in which a web page(s) of the online shopping mall is continuously displayed includes a state in which a plurality of web pages of the online shopping mall are replaced and displayed in turn by an operation of the user or the like. Then, the online shopping mall server 1 may cause the privilege information to be displayed for an item for sale whose name is included in the keyword among the items for sale determined as the candidates. In this case, a web page of the online shopping mall is displayed at this time, the web page displayed at this time need not be a sale item page. This is because during a time period in which a web page(s) of the online shopping mall is continuously displayed, that is, during a time period in which the user is in the online shopping mall, the probability that the interest of the user in an item for sale for which the user browses information in a sale item page during these time periods is not lost is high.

In this case, the online shopping mall server 1 needs to identify the time point at which the display of the webpage of the online shopping mall is switched to a display of a page of another website. In other words, the online shopping mall server 1 needs to identify the time point at which the user exits the online shopping mall. Therefore, the tool bar program may be configured so that when the display of the webpage of the online shopping mall is switched to a display of a page of another website, the user terminal 4 transmits a request in which a URL indicating that the display is switched is set to the online shopping mall server 1. The online shopping mall server 1 that receives the request registers an operation history including the URL that is set in the request in the operation history DB 12d. Thereby, the online shopping mall server 1 can identify the time point at which the display of the webpage of the online shopping mall is switched to a display of a page of another website.

Next, an operation of the information processing system S will be described with reference to FIGS. 21 and 22. The operation example described below is an operation example of a case in which items for sale whose sale item page is displayed while a web page of the online shopping mall is continuously displayed are determined as candidates for an item for sale which the privilege information is displayed.

Figure 21:
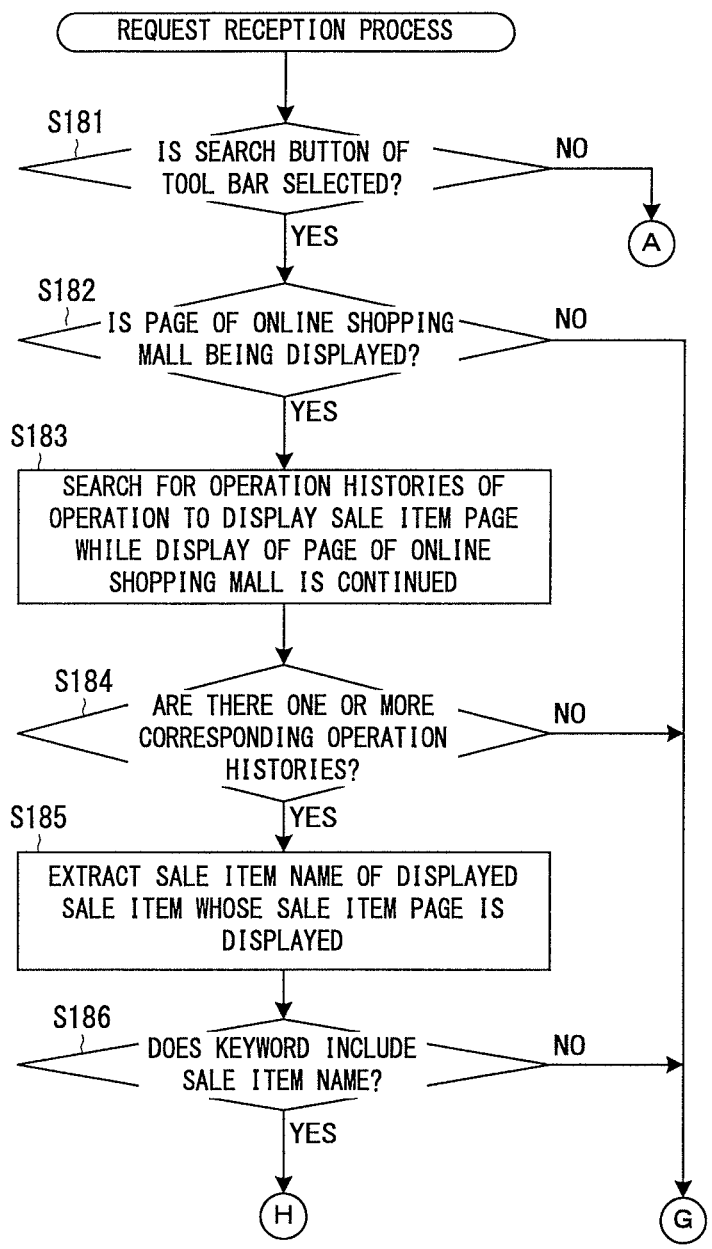
FIG. 21 is a flowchart showing a process example of a request reception process of a system control unit 14 of an online shopping mall server 1 according to an embodiment.
Figure 22:
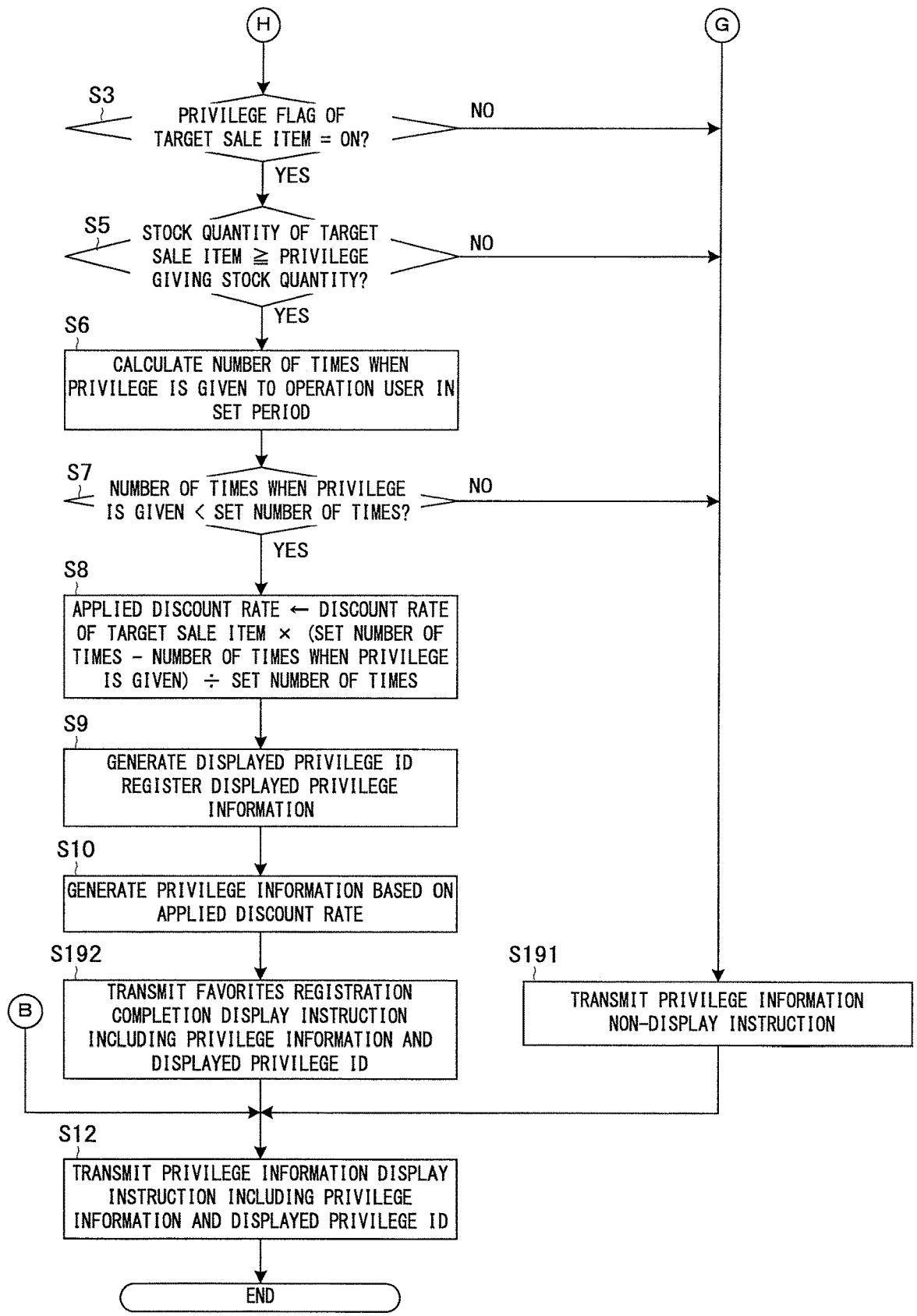
FIG. 22 is a flowchart showing a process example of the request reception process of the system control unit 14 of the online shopping mall server 1 according to the embodiment.

FIGS. 21 and 22 are a flowchart showing a process example of a request reception process of the system control unit 14 of the online shopping mall server 1 according to the present embodiment. In FIGS. 21 and 22, the same processes as those in FIG. 7 are denoted by the same reference numerals.

As shown in FIG. 21, the system control unit 14 determines whether or not an operation to select the search button of the tool bar is performed on the basis of the URL set in the received request (step S181). At this time, if the system control unit 14 determines that the operation to select the search button is not performed (step S181: NO), the system control unit 14 proceeds to step S21.

On the other hand, as a detection means, if the system control unit 14 determines that the operation to select the search button is performed (step S181: YES), the system control unit 14 determines whether or not the user terminal 4 that is the transmitter of the request is presently displaying a web page of the online shopping mall (step S182). Specifically, the system control unit 14 searches the operation history DB 12d for operation histories including the user ID of the operation user. Next, the system control unit 14 determines whether or not one or more operation histories are found. At this time, if no operation history is found, the system control unit 14 determines that a web page of the online shopping mall is not being displayed. On the other hand, if one or more operation histories are found, the system control unit 14 selects an operation history whose operation date and time is the latest from among the found operation histories. Next, if the selected operation history is an operation history of an operation to switch the display of the web page of the online shopping mall to a display of a page of another website, the system control unit 14 determines that a web page of the online shopping mall is not being displayed. Further, if the selected operation history is an operation history of an operation to request a search from the tool bar, the system control unit 14 determines that a web page of the online shopping mall is not being displayed.

If the system control unit 14 determines that a web page of the online shopping mall is not being displayed (step S182: NO), as shown in FIG. 22, as a response to the request, the system control unit 14 transmits a privilege information non-display instruction to the user terminal 4 that is the transmitter of the request (step S191). The privilege information non-display instruction is a message indicating an instruction not to display the privilege information. Next, the system control unit 14 proceeds to step S12. The user terminal 4 that receives the privilege information non-display instruction displays the web search result page but does not display the privilege display area 530.

In step S182, if the latest operation history is neither an operation history of an operation to switch the display of a web page of the online shopping mall to a display of a page of another website nor an operation history of an operation to request a search from the tool bar, the system control unit 14 determines that a web page of the online shopping mall is being displayed (step S182: YES). In this case, the system control unit 14 searches for operation histories of an operation to display a sale item page while the display of a web page(s) of the online shopping mall is continued (step S183). Specifically, the system control unit 14 searches for operation histories of an operation to switch the display of a web page of the online shopping mall to a display of a page of another website from among the operation histories found in step S182. Next, the system control unit 14 selects the latest operation date and time from among operation date and times included in the found operation histories. Next, the system control unit 14 searches for operation histories of an operation to display a sale item page from among operation histories whose operation date and time is included in a period from a selected date and time to the current time among the operation histories found in step S182.

Next, the system control unit 14 determines whether or not one or more operation histories of an operation to display a sale item page is found (step S184). At this time, if the system control unit 14 determines that no operation history of an operation to display a sale item pages found (step S184: NO), the system control unit 14 proceeds to step S191. On the other hand, if the system control unit 14 determines that one or more operation histories of an operation to display a sale item page is found (step S184: YES), the system control unit 14 extracts the name of the item for sale whose sale item page is displayed (step S185). The item for sale whose sale item page is displayed is referred to as a "displayed sale item". Specifically, the system control unit 14 acquires the shop ID and the sale item ID of the displayed sale item from the URL included in the operation history of an operation to display a sale item page. Next, the system control unit 14 acquires the sale item information including the acquired shop ID and sale item ID of the item for sale from the sale item information DB 12b. Then, the system control unit 14 acquires the sale item name from the acquired sale item information. Next, the system control unit 14 extracts the official name from the sale item name acquired from the sale item information. For example, the system control unit 14 extracts words that can be a name from the sale item name acquired from the sale item information by performing morphological analysis or the like. Next, the system control unit 14 identifies an official name by removing, for example, words corresponding to a generic name or the like from the extracted words. The system control unit 14 may acquire the official name from, for example, the sale item description included in the sale item information. This is because, for example, when information "sale item name: ○○○○○○○○○○" is included in the sale item description, there is a probability that "○○○○○○○○○○" is the official name.

Next, the system control unit 14 determines whether or not the keyword inputted in the keyword input area includes the extracted name (step S186). At this time, if the system control unit 14 determines that the keyword does not include the name of the displayed sale item (step S186: NO), the system control unit 14 proceeds to step S191. On the other hand, if the system control unit 14 determines that the keyword includes the name of the displayed sale item (step S186: YES), as shown in FIG. 22, the system control unit 14 performs steps S3 and S5 to S10. In steps S3 to S10, the system control unit 14 performs the process by using the sale item information of the displayed sale item whose name is included in the keyword inputted in the keyword input area.

Next, as a presentation means, the system control unit 14 transmits, as a response to the request, a privilege information display instruction including the privilege information and the displayed privilege ID to the user terminal 4 that is the transmitter of the request (step S192). The privilege information display instruction is a message indicating an instruction to display the privilege information. After completing this process, the system control unit 14 proceeds to step S12. The user terminal 4 that receives the privilege information display instruction displays the web search result page and also displays the privilege display area 530 as shown in FIG. 20B.

As described above, according to the present embodiment, the system control unit 14 detects an operation to request a website different from the online shopping mall to perform a search using a search condition including the name of an item for sale whose sale item page is displayed in the online shopping mall, and when the operation is detected, the system control unit 14 causes the privilege information to be presented. Therefore, it is possible to appropriately identify a time when the purchase motivation of the user exceeds the level where the user is merely interested in the item for sale.

In the present embodiment, a name of an item for sale is applied as identification information of the transaction target of the present invention. However, the identification information of the present invention can be applied to information other than name if the information is information which identifies an item for sale and by which information of an item for sale can be searched for. For example, the identification information may be a product code.

In the present embodiment, the present invention is applied to a site that searches a web page as a website that is requested to perform a search. However, the present invention may be applied to a website other than a site that searches a web page on condition that the website is a website which is different from the online shopping mall server 1 managed by the online shopping mall server 1 and which can perform a search by using identification information of an item for sale. For example, the present invention may be applied to a site from which items for sale can be purchased, a site where prices of items for sale are compared, a site of word-of-mouth communication of items for sale, a site of encyclopedia, and the like.

In the embodiments described above, the online shopping mall server 1 performs control so that no privilege information is displayed when the stock quantity is smaller than the privilege giving stock quantity. However, the online shopping mall server 1 may perform control so that the privilege information is displayed regardless of the quantity of stock.

The online shopping mall server 1 may be configured so that a plurality of embodiments selected from among the first to the seventh embodiments are combined and implemented. In other words, the online shopping mall server 1 may detect a plurality of types of operations as the privilege giving target operation. The examples of the privilege giving target operation are not limited to the operations described in the first to the seventh embodiments. Operations where the user's purchase motivation for an item for sale of the operation target is higher than the user's purchase motivation during an operation to display a sale item page and which are not necessary to purchase an item for sale whose sale item page is displayed can be included in the privilege giving target operation.

In the embodiments described above, the online shopping mall server 1 is configured so that the sale item price is discounted as the privilege. However, the online shopping mall server 1 may be configured so that a privilege whose type is different from that of the discount of sale item price is given. Further, the online shopping mall server 1 may be configured so that a shop can select a privilege to be given from among a plurality of types of privileges.

Further, there is a case in which the online shopping mall server 1 need not transmit the privilege information to the user terminal 4 to cause the user terminal 4 to display the privilege information. For example, the online shopping mall server 1 may transmit information indicating the type of the privilege and information indicating the value of the privilege to the user terminal 4. Then, the user terminal 4 may generate the privilege information based on the received information. When the type and the value of the privilege are constant in the entire online shopping mall, the online shopping mall server 1 may only transmit a message indicating an instruction to display the privilege information to the user terminal 4. Then, the user terminal 4 that receives the instruction may display predetermined privilege information.

In the embodiments described above, the online shopping mall server 1 performs control so that the privilege information is displayed on the screen of the user terminal 4. However, the online shopping mall server 1 may perform control so that the privilege information is outputted as a sound from a speaker connected to the user terminal 4.

In the embodiments described above, the present invention is applied to the online shopping mall in which items for sale are sold from a plurality of shops. However, the present invention may be applied to a website of electronic commerce in which items for sale are sold from a single distributor.

In the embodiments described above, the transaction target of the present invention is applied to an item for sale. However, the transaction target may be applied to a service. The present invention may be applied to a website where a service can be purchased or reserved. The purchase of a service means that a user receives provision of a service by paying a charge for the service. Examples of the service include provision of an accommodation facility, provision of an athletic facility such as a golf course, and transportation of people by transportation facilities. An operation necessary to purchase a service that requires a reservation is, for example, an operation necessary to reserve the service. In the service, the number of remains is, for example, the number of vacant rooms and the number of vacant seats.

REFERENCE SIGNS LIST

1 Online shopping mall server
2 Web search server
3 Shop terminal
4 User terminal
11 Communication unit
12 Storage unit
12*a* Member information DB
12*b* Sale item information DB
12*c* Favorites information DB
12*d* Operation history DB
12*e* Displayed privilege information DB
12*f* Shopping cart information DB
12*g* Purchase history DB
13 Input/output interface
14 System control unit
14*a* CPU
14*b* ROM
14*c* RAM
15 System bus
NW Network
S Information processing system

The invention claimed is:

1. An information processing system comprising:
at least one memory operable to store program code;
a storage configured to store a plurality of predetermined operations of a plurality of users in a transaction site; and
at least one processor operable to read said program code and operate as instructed by said program code, said program code including:
detection code that causes at least one of said at least one processor to detect a predetermined operation of a user on a web page including transaction target information that indicates details of a transaction target in a transaction site where transaction targets can be purchased while a terminal is displaying the web page, wherein the predetermined operation is stored in the storage and accessed over a network, is different from an operation of purchasing on the transaction site, and indicates a user operation where motivation for purchasing the transaction target of the transaction targets sold on the transaction site is higher than that of an operation to display, for the user on a display of the terminal, transaction target information related to the transaction target;
privilege flag detection code that, when the predetermined operation is detected, causes at least one of said at least one processors to access a database stored in the at least one memory and identify whether a privilege flag corresponding to the transaction target is on; and
presentation code that, when the predetermined operation is detected and the privilege flag corresponding to the transaction target is on, causes at least one of said at least one processors to display on the web page, for the user on the display of the terminal, privilege information on condition that the user purchases the transaction target, wherein
the privilege information indicates a privilege of the user, when an amount of privileges given to the user in a preset time period exceeds or is equal to a preset amount, the privilege information ceases to be displayed, and
the presentation code causes at least one of said at least one processor to display the privilege information including a value of the privilege based on the amount of privileges given to the user in the preset time period and set the value of the privilege so that the greater the amount, the smaller the value of the privilege.

2. The information processing system according to claim 1, wherein
the detection code causes at least one of said at least one processor to detect a user operation to register a transaction target in a reference list holding a reference to the transaction target information of the registered transaction target.

3. The information processing system according to claim 2, wherein
when a preset number of, or more, transaction targets which are the same as the transaction target targeted by the operation detected and are sold by sellers different from a seller of the transaction target targeted by the detected operation are registered in the reference list, the privilege information is not displayed.

4. The information processing system according to claim 2, wherein
the presentation code causes at least one of said at least one processor to display the privilege information including a value of the privilege based on a number of transaction targets which are the same as the transaction target targeted by the operation detected and are sold by sellers different from a seller of the transaction target targeted by the detected operation to be presented, and set the value of the privilege so that the greater the number, the smaller the value of the privilege.

5. The information processing system according to claim 2, wherein
when a ratio of purchased transaction targets to transaction targets registered in the reference list is smaller than a preset ratio, the privilege information is displayed.

6. The information processing system according to claim 2, wherein
the presentation code causes at least one of said at least one processor to display the privilege information including a value of the privilege based on a ratio of purchased transaction targets to transaction targets registered in the reference list and set the value of the privilege so that the smaller the ratio, the greater the value of the privilege.

7. The information processing system according to claim 1, wherein
the detection causes at least one of said at least one processor to detect an operation to display a reference list holding a reference to the transaction target information of a transaction target registered by a user.

8. The information processing system according to claim 1, wherein
the detection code causes at least one of said at least one processor to detect an operation to display the transaction target information of a transaction target registered in a reference list holding a reference to the transaction target information of a transaction target registered by a user as an operation where motivation to purchase is higher than that of an operation to display the transaction target information of a transaction target that is not registered in the reference list.

9. The information processing system according to claim 1, wherein
the detection code causes at least one of said at least one processor to detect an operation to delete a transaction target from a purchase list in which a transaction target selected by a user as a target which the user intends to purchase is registered.

10. The information processing system according to claim 9, wherein
when a frequency at which the user performs the operation to delete a transaction target from the purchase list is higher than or equal to a preset frequency, the privilege information is not displayed.

11. The information processing system according to claim 9, wherein
the presentation code causes at least one of said at least one processor to display the privilege information including a value of the privilege based on a frequency at which the user performs the operation to delete a transaction target from the purchase list to be presented and set the value of the privilege so that the higher the frequency, the lower the value of the privilege.

12. The information processing system according to claim 1, wherein
the detection code causes at least one of said at least one processor to detect an operation to request a second transaction site different from the transaction site to perform a search using a search condition including identification information for a transaction target whose transaction target information was displayed on the transaction site.

13. The information processing system according to claim 1, wherein
when a quantity of an item targeted by the operation detected is smaller than a preset number, the privilege information is not displayed.

14. The information processing system according to claim 1, wherein
the presentation code causes at least one of said at least one processor to display the privilege information immediately after the predetermined operation is detected.

15. The information processing system according to claim 1, wherein said program code further includes receiving code that causes at least one of said at least one processor to receive, from a user terminal via a network, a request comprising a URL that indicates details of an operation, and
wherein the detection code causes at least one of said at least one processor to detect the predetermined operation based on the URL received from the user terminal via the network.

16. An information processing method performed by a computer, the method comprising:
detecting a predetermined operation of a user on a web page including transaction target information that indicates details of a transaction target in a transaction site where transaction targets can be purchased while a terminal is displaying the web page, wherein the predetermined operation indicates a user operation where motivation for purchasing the transaction target sold on the transaction site is higher than that of an operation to display transaction target information related to the transaction target;
when the predetermined operation is detected, identifying whether a privilege flag that is stored in a memory of the computer and corresponds to the transaction target is on; and
when the predetermined operation is detected and the privilege flag corresponding to the transaction is on, displaying privilege information on the web page on condition that the user purchases the transaction target, wherein
the privilege information indicates a privilege of the user,
when an amount of privileges given to the user in a preset time period exceeds or is equal to a preset amount, the privilege information ceases to be displayed, and
the privilege information that is displayed includes a value of the privilege based on the amount of privileges given to the user in the preset time period and the value of the privilege is set so that the greater the amount, the smaller the value of the privilege.

17. An information processing system comprising:
at least one memory operable to store program code;
a storage configured to store a plurality of predetermined operations of a plurality of users in a transaction site; and at least one processor operable to read said program code and operate as instructed by said program code, said program code including:

receiving code that causes at least one of said at least one processor to receive, from a user terminal via a network, a request comprising a URL that indicates details of an operation;

detection code that causes at least one of said at least one processor to detect, based on the URL received from the user terminal via the network, a predetermined operation of a user on a web page including transaction target information that indicates details of a transaction target in a transaction site where transaction targets can be purchased while the user terminal is displaying the web page, wherein the predetermined operation is stored in the storage and accessed over a network, is different from an operation of purchasing on the transaction site, and indicates a user operation where motivation for purchasing the transaction target of the transaction targets sold on the transaction site is higher than that of an operation to display, for the user on a display of the user terminal, transaction target information related to the transaction target; and presentation code that, when the predetermined operation is detected, causes at least one of said at least one processors to display on the web page, for the user on the display of the user terminal, privilege information on condition that the user purchases the transaction target, wherein the privilege information indicates a privilege of the user when an amount of privileges given to the user in a preset time period exceeds or is equal to a preset amount, the privilege information ceases to be displayed, and the privilege information that is displayed includes a value of the privilege based on the amount of privileges given to the user in the preset time period and the value of the privilege is set so that the greater the amount, the smaller the value of the privilege.

* * * * *